(12) United States Patent
Miura

(10) Patent No.: US 8,421,897 B2
(45) Date of Patent: Apr. 16, 2013

(54) IMAGE CAPTURING APPARATUS AND CONTROL METHOD THEREFOR

(75) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/754,332

(22) Filed: Apr. 5, 2010

(65) Prior Publication Data

US 2010/0259652 A1 Oct. 14, 2010

(30) Foreign Application Priority Data

Apr. 8, 2009 (JP) .................................. 2009-094368
Jun. 5, 2009 (JP) .................................. 2009-136709
Dec. 24, 2009 (JP) .................................. 2009-293202

(51) Int. Cl.
   *H04N 5/222* (2006.01)
(52) U.S. Cl.
   USPC .................................................... 348/333.02
(58) Field of Classification Search .............. 348/333.02
   See application file for complete search history.

(56) References Cited

U.S. PATENT DOCUMENTS

| | | | | |
|---|---|---|---|---|
| 5,496,106 A | * | 3/1996 | Anderson | 348/255 |
| 2007/0052836 A1 | * | 3/2007 | Yamada et al. | 348/345 |

FOREIGN PATENT DOCUMENTS

| | | |
|---|---|---|
| JP | 06-121184 | 4/1994 |
| JP | 2001-333299 A | 11/2001 |
| JP | 2002-196225 A | 7/2002 |
| JP | 2005-345962 A | 12/2005 |
| JP | 4089675 | 5/2008 |
| JP | 2009-111487 A | 5/2009 |
| WO | 2008/063811 A1 | 5/2008 |

* cited by examiner

*Primary Examiner* — James Hannett
(74) *Attorney, Agent, or Firm* — Cowan, Liebowitz & Latman, P.C.

(57) ABSTRACT

Edge components in a predetermined direction of a captured image are extracted to generate a waveform image representing the levels of the extracted edge components and the extracted positions. The waveform image is displayed with the captured image. For example, the operability and visibility for focusing in manual focusing can be improved.

26 Claims, 18 Drawing Sheets

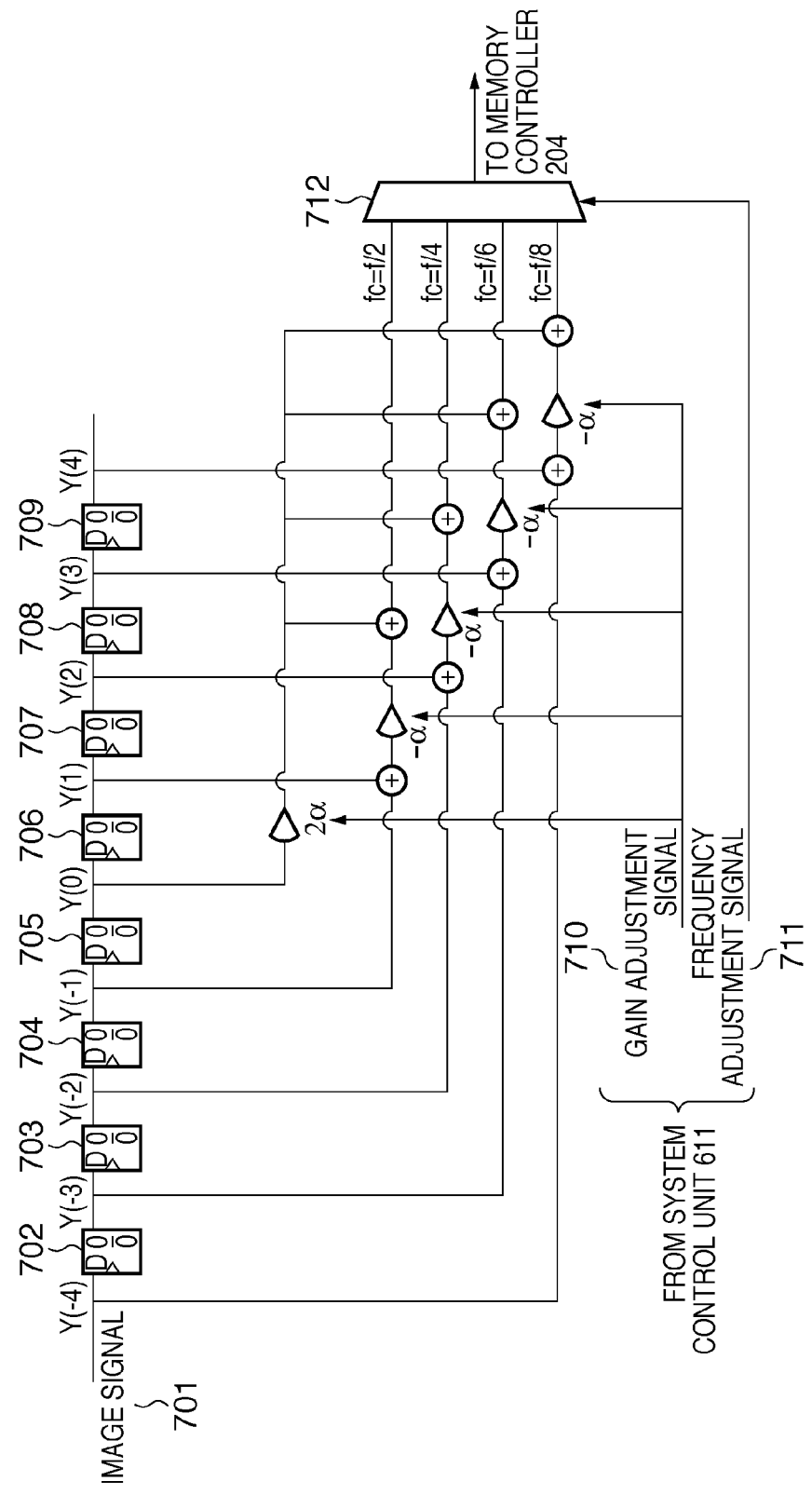

IMAGE CAPTURING APPARATUS AND CONTROL METHOD THEREFOR

BACKGROUND OF THE INVENTION

1. Field of the Invention

The present invention relates to an image capturing apparatus and a control method therefor, and more particularly, to a technique for displaying the degree of in-focus in an image capturing apparatus.

2. Description of the Related Art

In conjunction with advances in automatic focus detection (AF) techniques, AF is mainly used for focus detection in image capturing apparatuses such as still cameras and video cameras. However, under conditions in which focusing through AF is hard to carry out, such as in a case in which strict focusing is required as in macro image capturing, or in a case in which defocused images are intentionally captured, images are often captured through manual focus adjustment (MF).

In particular, in a case in which MF operation is to be carried out, operability and accuracy in focusing are greatly affected by the resolution of an optical finder or an electronic viewfinder (EVF). However, increases in optical finders and display devices in terms of size and resolution leads to increases in image capturing apparatuses in terms of size and price. Therefore, at present it is difficult to say that every image capturing apparatuses is equipped with an optical finder or a display device sufficient to achieve easy and high-accuracy MF operation.

Thus, in order for photographers to figure out the degree of in-focus (in-focus state) more clearly, various assist indications have been introduced, including, for example, highlighting (peaking) for focused edge portions of a captured image and partially enlarged indications for checking the in-focus state.

Furthermore, Japanese Patent Laid-Open No. 6-121184 discloses a method of obtaining the integrated value for high-frequency components of luminance signals from an image as an "evaluation value" indicating the degree of in-focus, and synthesizing and displaying, in the form of a bar graph, changes in magnitude of the integrated value onto an EVF image.

Moreover, Japanese Patent No. 4089675 discloses a method of generating a histogram of the magnitude of a high-frequency component for captured image signals as an "evaluation value" indicating the degree of in-focus, and synthesizing and displaying the histogram onto an EVF image.

While peaking refers to highlighting of focused edge portions of an EVF image, it is hard to distinguish the highlighting depending on the sizes and locations of the focused edge portions. Furthermore, there has been an attempt to color only focused edge portions of an EVF image, whereas the rest of the image is displayed in black and white. However, this approach has a problem in that the change to the display in black and white degrades the visibility of the captured object through the EVF.

In addition, in the methods disclosed in Japanese Patent Laid-Open No. 6-121184 and Japanese Patent No. 4089675, it is difficult to figure out which part has the degree of in-focus indicated by the "evaluation value" indicating the degree of in-focus. Furthermore, since the change in the magnitude of the integrated value is expressed by the height of the bar graph or the spread of the histogram, it is not easy to figure out the maximum value of the evaluation value.

SUMMARY OF THE INVENTION

The present invention has been made in view of the problems of the conventional art described above, and provides an image capturing apparatus with improved operability and visibility for focusing, and a control method therefor.

According to an aspect of the present invention, there is provided an image capturing apparatus that has a function of focus adjustment of a lens for forming an object image on an image sensor, the image capturing apparatus comprising: an extraction unit adapted to extract an edge component of an image captured by the image sensor in a predetermined direction; a generation unit adapted to generate a waveform image representing a relationship between a position and a level of an edge component extracted by the extraction unit in the predetermined direction; and a display unit adapted to exercise control so as to sequentially display the image captured by the image sensor and the waveform image on a display device.

According to another aspect of the present invention, there is provided a control method for an image capturing apparatus that has a function of focus adjustment of a lens for forming an object image on an image sensor, the control method comprising: an extraction step of extracting an edge component of an image captured by the image sensor in a predetermined direction; a generation step of generating a waveform image representing a relationship between a position and a level of the edge component extracted in the extraction step in the predetermined direction; and a display step of exercising control so as to sequentially display the image captured by the image sensor and the waveform image on a display device.

Further features of the present invention will become apparent from the following description of exemplary embodiments with reference to the attached drawings.

BRIEF DESCRIPTION OF THE DRAWINGS

FIG. 7 is a diagram illustrating a configuration example of an edge extraction circuit in a high-vision digital video camera according to an embodiment of the present invention;

DESCRIPTION OF THE EMBODIMENTS

Exemplary embodiments of the present invention will now be described in detail in accordance with the accompanying drawings.

First Embodiment

A high-vision digital video camera provided with a manual focusing function will be described as an example of an image capturing apparatus according to a first embodiment of the present invention. However, the present invention is applicable to cameras which have a focusing function of carrying out focus adjustment and any apparatuses including a display device. Such apparatuses include, for example, digital still cameras and personal digital assistants each with a camera.

Figure 6:
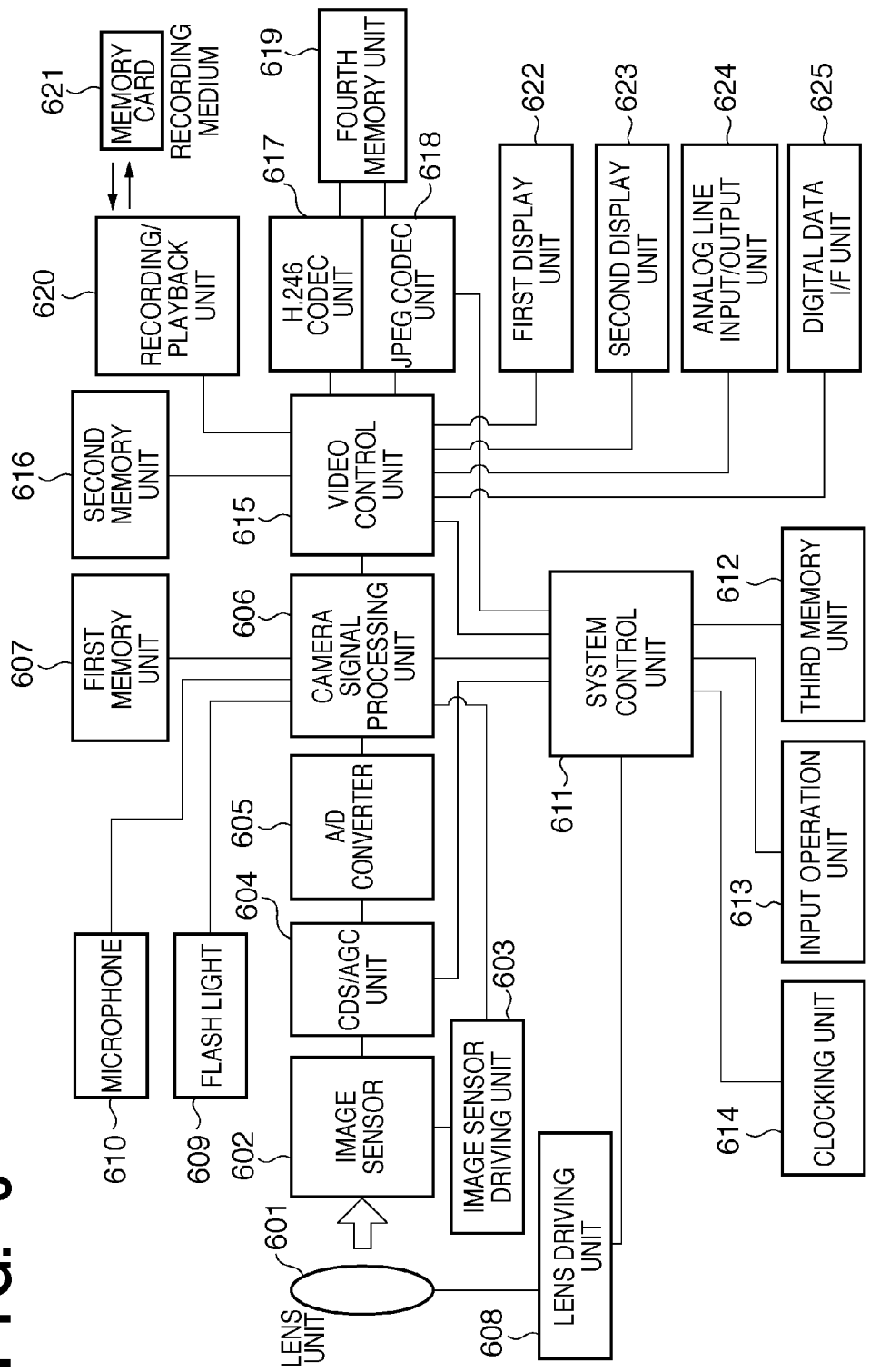
FIG. 6 is a block diagram illustrating a block diagram illustrating a configuration example of a high-vision digital video camera according to an embodiment of the present invention.
Figure 8B:
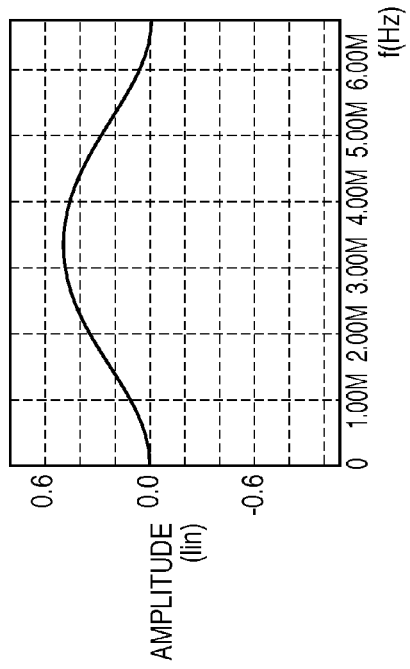
FIGS. 8A to 8D are diagrams showing examples of frequency characteristics of the edge extraction circuit in FIG. 7.
Figure 8D:
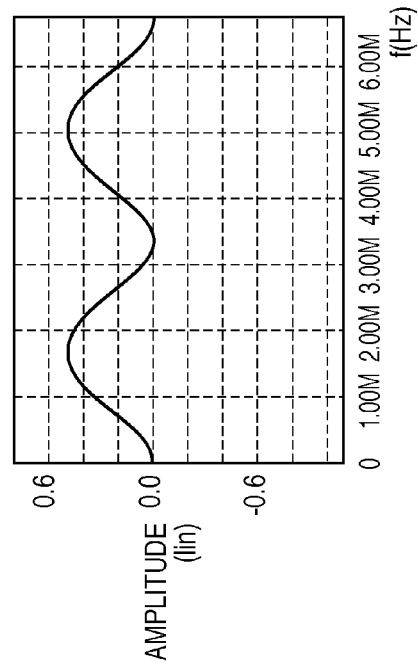
Figure 8A:
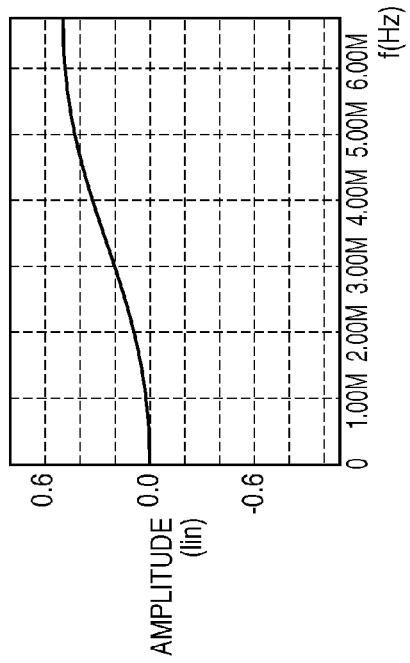
Figure 8C:
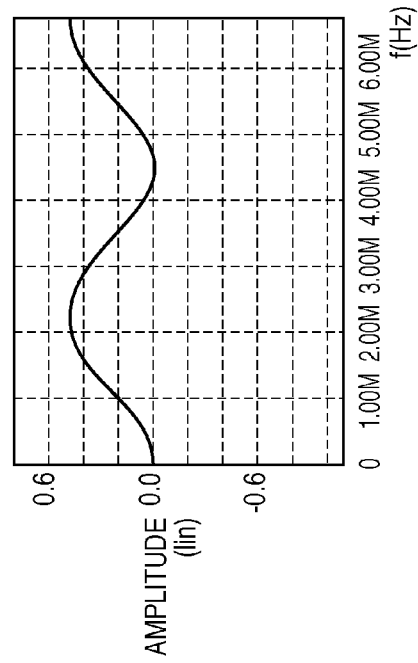

In a block diagram shown in FIG. 6, a lens unit 601 constitutes an optical system for forming an object image on an imaging surface of an image sensor 602, and has a zoom function, a focus adjustment function, and an aperture adjustment function. The image sensor 602 has a number of photoelectric conversion elements two-dimensionally arranged, and converts an object optical image formed by the lens unit 601 into image signals for each pixel. The image sensor 602 may be, for example, a complementary metal oxide semiconductor (CMOS) image sensor or a charged coupled device (CCD) image sensor. The image sensor 602 is also provided with an electronic shutter function through control of the period for charge storage by the photoelectric conversion elements.

An image sensor driving unit 603 controls the drive of the image sensor 602 in accordance with a timing controlled by a camera signal processing unit 606. A CDS/AGC unit 604 applies correlated double sampling (CDS) to analog image signals from the image sensor 602 to reduce noises, and exercises gain control (AGC) of the signal level in accordance with the control exercised by a system control unit 611. An A/D (analog to digital) converter 605 converts analog image signals from the CDS/AGC unit 604, into digital image signals, and supplies the digital image signals to the camera signal processing unit 606.

The camera signal processing unit 606 exercises control of an image capturing system of the camera, such as generation of timing signals, automatic exposure (AE) control, gamma control, and automatic focusing (AF) control, in cooperation with the system control unit 611. For example, the "AF evaluation value" as the criterion for determining the degree of in-focus during automatic focusing is calculated by the camera signal processing unit 606.

Furthermore, while it is assumed in the present embodiment that there are nine focus detection frames arranged in a 3×3 grid in the screen, the number and positions of focus detection frames for use in AF control are to be selected on the basis of a captured image or a user setting.

The video camera according to the present embodiment has a first memory unit 607, a second memory unit 616, a third memory unit 612, and a fourth memory unit 619 depending on applications. While the first memory unit 607, the second memory unit 616, the third memory unit 612, and the fourth memory unit 619 are described here for the sake of convenience, as individually provided respectively for camera signal processing, for video control, for system control, and for CODEC, the units may be implemented physically in the same memory device. While the first to fourth memory units 607, 616, 612, and 619 are typically composed of readable and writable semiconductor memories, at least one of the units may be composed of another type of memory device.

The first storage unit 607 is used by the camera signal processing unit 606, as a frame memory in signal processing for captured images. A lens driving unit 608 drives a motor and an actuator, not shown, of the lens unit 601 in accordance with control exercised by the system control unit 611 to carry out the zoom magnification, focus adjustment, and exposure adjustment. The lens driving unit 608 is controlled by the system control unit 611, on the basis of the result of signal processing in the camera signal processing unit 606. For example, during AF control, the system control unit 611 controls the lens driving unit 608 on the basis of an AF evaluation value obtained calculated by the camera signal processing unit 606 to control the drive of a lens for focus adjustment in the lens unit 601, thereby focusing the lens unit 601 on an object.

In a case in which a manual focus mode is set for manually carrying out focus adjustment of the lens unit 601, the system control unit 611 detects a focus detection operation carried out by the photographer. Specifically, the system control unit 611 detects the operation of a switch or a lever for the adjustment of the focal length, included in an input operation unit 613, or a focus ring provided on the periphery of a lens-barrel of the lens unit 601. Then, on the basis of the direction and distance of a focal shift in response to the detected operation, the system control unit 611 controls the lens driving unit 608 and changes the focal length of the lens unit 601. It is to be noted that in a case in which the focal length of the lens unit 601 can be mechanically changed with the switch or lever operated by the photographer, there is no need for the intervention of the system control unit 611 or the lens driving unit 608.

A flash light 609 is used as an assist light source in capturing still images, if necessary, or depending on the setting made by the photographer. A microphone 610 is expected to be effective for recording ambient sounds, and sound signals from the microphone 610 are supplied to the camera signal processing unit 606. For example, in a case in which sounds from the microphone 610 are to be recorded in conjunction with images captured by the image sensor 602, the camera signal processing unit 606 supplies both the images and sounds to a video control unit 615 along the time axis.

The system control unit 611 may be, for example, a CPU, which generally controls the operation of the video camera according to the present embodiment, including assist indication processing during manual focusing as will be described later, for example, by executing a program stored in the third memory unit 612. The third memory unit 612 includes, for example, a ROM or a RAM, which stores programs to be executed by the system control unit 611, a variety of settings and initial values, etc. Furthermore, the third memory unit 612 is also used as a work area for the system control unit 611.

The input operation unit 613 is a user interface for the photographer to provide instructions to the video camera, which includes input devices such as a key, a button, and a touch panel. In the present embodiment, the input operation unit 613 includes an enlarged display ON/OFF button, and selection buttons and set buttons for a variety of functions such as zebra pattern or peaking display ON/OFF and manual focus assist function display ON/OFF. Furthermore, a shutter button for capturing still images, a MF ring, a zoom switch, and an aperture adjustment dial, etc., are also included in the input operation unit 613. A clocking unit 614 includes a real time clock (RTC) and a backup battery, which send back information on time and date in response to a request from the system control unit 611.

The video control unit 615 exercises display control including the adjustment of hue, color saturation, and lightness for a first display unit 622 and a second display unit 623, input/output control for an analog line input/output unit 624, output control for a digital data I/F unit 625, control for a recording/playback unit 620, etc. The video control unit 615 also carries out the resolution conversion for image signals to respective image output systems including the first display unit 622 and the second display unit 623, generation and superimposition of zebra patterns and peaking signals, edge component extraction and waveform generation from captured images, etc. The video control unit 615 further exercises control of on screen display (OSD) such as image capturing information or user setting menus. The second memory unit 616 is a memory unit for video control, which is used as a frame memory, a working memory, or the like when the video control unit 615 carries out signal processing for video baseband signals.

A H.264 codec unit 617 is an example of moving image codec for carrying out coding/decoding processing of moving images. The format for coding/decoding may be a MPEG (Moving Picture Experts Group) −2 format, as well as other formats. Likewise, a JPEG (Joint Photographic Experts Group) codec unit 618 an example of still image codec for carrying out coding/decoding processing of still images. The format for coding/decoding may also be JPEG 2000 or PNG, or other formats. It is to be noted that in the present embodiment, the JPEG codec unit 618 is connected to the video control unit 615 in order to share the circuit with the H.264 codec unit 617 and achieve the function of capturing still images from moving images played back. However, the JPEG codec unit 618 may be directly connected to the camera signal processing unit 606. The fourth memory unit 619 is used for codec, whereas the H.264 codec unit 617 and the JPEG codec unit 618 are used for coding/decoding of image signals.

The recording/playback unit 620 records, on a recording medium 621, data to be recorded, which has been subjected to a coding process and processed into a record format by the video control unit 615 and by the H.264 codec unit 617 or the JPEG codec unit 618, and reads out the data from the recording medium 621. It is to be noted that the recording medium 621 is not limited to a memory card, and even when the recording medium 621 is a DVD, or a much higher-capacity optical disk or HDD, a record/playback system is separately configurable depending on each recording medium.

The first display unit 622 and the second display unit 623 are display devices, which are both able to display similar information. However, it is assumed in the present embodiment that the second display unit 623 is smaller than the first display unit 622 and provided in a viewfinder. On the other hand, the first display unit 622 is a relatively large-size display device provided, for example, on a side surface or the like of the casing in an openably closable manner.

On these first and second display units 622 and 623, assist indications such as a focus frame indication are displayed in addition to input images and enlarged images from the image sensor 602 in an image capturing mode. When input images from the image sensor 602 are sequentially displayed, the first and second display units 622 and 623 function as electronic viewfinders (EVF). The assist indications include zebra pattern indications, as well as assist indications for manual focusing, such as peaking indications and waveform indications of edge components of captured images.

On the other hand, moving images or still images recorded on the recording medium 621 are displayed on the first and second display units 622 and 623 in a playback mode. Furthermore, it is also possible for the first and second display units 622 and 623 to display input operation information input by the photographer from the input operation unit 613 or any image information (image capturing information) in the memory card of the recording medium 621.

The analog line input/output unit 624 is a group of interfaces such as analog component image output, S terminal input/output, and composite image input/output. The analog line input/output unit 624 can be connected to an external monitor or the like to display image output from the high-vision digital video camera on the external monitor, or connected to an external image device to accept image input from the external image device.

The digital data I/F unit 625 can include one or more digital interfaces such as a USB I/F, an IEEE 1394 I/F, and a HDMI.

Figure 2:
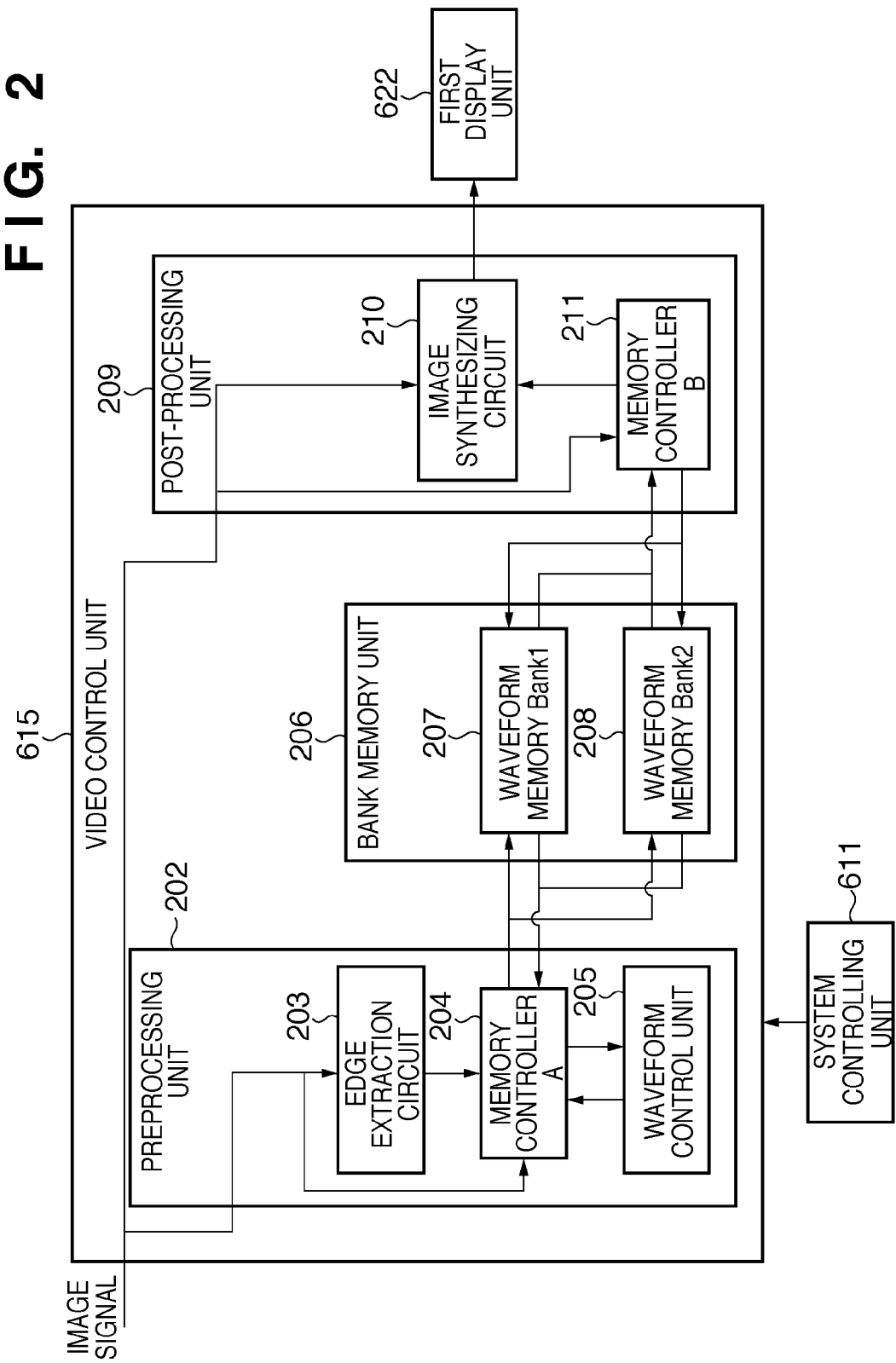
FIG. 2 is a block diagram illustrating a configuration example regarding waveform display processing of a video control unit in a high-vision digital video camera according to an embodiment of the present invention.

For the video control unit 615 which carries out generation and superimposition of zebra pattern and peaking signals, edge component extraction from captured images, and generation of images (waveform images) representing the edge components, the configuration concerning waveform display for the edge components will be further described with reference to FIG. 2.

A preprocessing unit 202 includes an edge extraction circuit 203, a memory controller A 204, and a waveform control unit 205.

The edge extraction circuit 203 extracts edge signals from captured images. The edge extraction circuit 203 in the present embodiment extracts edge signals with the use of a finite impulse response (FIR)-type bandpass filter. The edge extraction circuit 203 will be described in detail later.

The memory controller A 204 controls bank switching between a waveform memory Bank1 207 and a waveform memory Bank2 208 in a bank memory unit 206, and exercises for memory access. The memory controller A 204 generates an address for memory access in light of information on the present coordinates of an image signal and the amplitude of edge information extracted by the edge extraction circuit 203 as information in an orthogonal coordinate system.

For example, in the case of horizontal display shown in FIG. 1A described later, access control is exercised with the address space of the memory regarded as a two-dimensional space in which the horizontal axis indicates the horizontal coordinate of an image signal, whereas the vertical axis indicates the amplitude (level) of edge information. The access processing refers to processing of first reading out data at the corresponding address and writing the data processed in the waveform control unit 205 described later, again via the memory controller A 204 back to the same address.

The waveform control unit 205 adds data of edge information extracted in the edge extraction circuit 203, which has been multiplied by any gain, to data read out from the waveform memory Bank1 207 by the memory controller A 204, and returns the data again to the memory controller A 204. The control of the gain by which the waveform control unit 205 multiplies the data of the edge information, from the system control unit 611, allows the rate of data increase due to the frequency to be controlled, and allows the visibility to be controlled.

These steps of processing and processing in an image synthesizing circuit 210 allow control to be exercised so that the display luminance is higher (brighter) when the data value at a frequently accessed address is larger, that is, the frequency at the same level is higher. It is to be noted that the initial value at each address is, for example, a value corresponding to the lowest luminance, a predetermined value is written when the address is first accessed, and starting from the second access the reading out and writing back described above can be carried out. An advantageous effect of exercising the control of the frequency is that unexpected noise components which are not edges can be prevented from being displayed or recognized as if the noise components were edges.

After the processing for one field (or one frame) is completed, data at each address is read out by a memory controller B 211, and a waveform image (edge component image) is generated on the basis of the read addresses and data. In the present embodiment, in the case of the horizontal display shown in FIG. 1A, access control is exercised with the address space of the memory regarded as a two-dimensional space in which the horizontal axis indicates the horizontal coordinate of an image signal, whereas the vertical axis indicates the amplitude (level) of edge information. Therefore, edge components corresponding to the video content of a captured image, that is, the in-focus state, can be visually ascertained.

Furthermore, according to the access control described above, a large amount of data is written at a frequently accessed address. More specifically, the more frequently the edge component at the same level is extracted at the same coordinates (position) in the direction of the extraction, the higher (brighter) the luminance of a mark representing the same level will be indicated.

In addition, in a case in which different levels of edge components are extracted at different frequencies at the same coordinates in the direction of extracting edge components (the horizontal or vertical direction in the present embodiment), the luminance of a mark corresponding to the position is not constant, and varied at the position corresponding to the detected level.

Figure 1A:
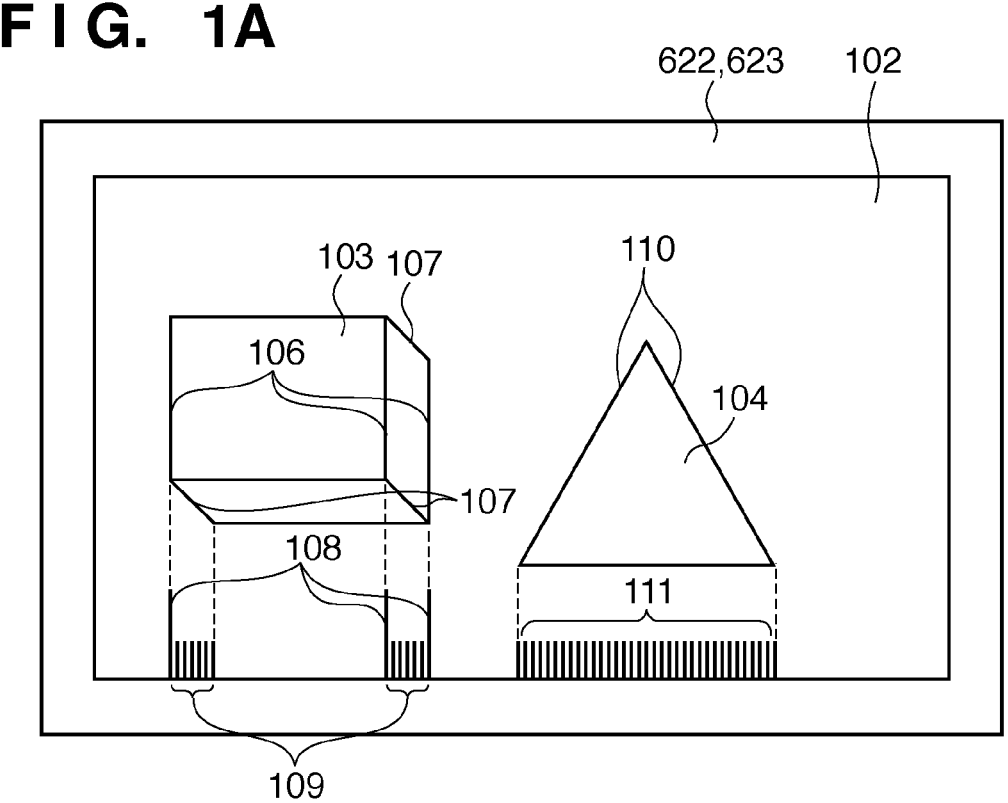
FIGS. 1A and 1B are diagrams schematically illustrating a screen with the levels of edge components of captured image signals displayed as a waveform along with a captured image, in a high-vision digital video camera as an example of an image capturing apparatus according to an embodiment of the present invention.
Figure 1B:
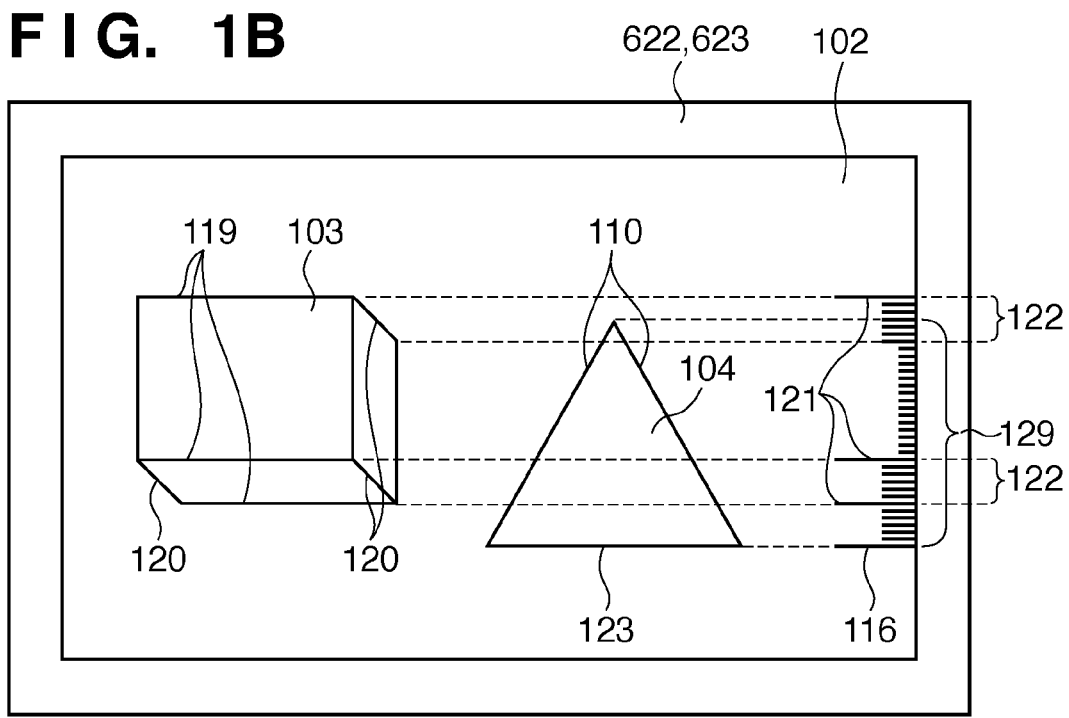

In the case of vertical display shown in FIG. 1B, access control may be carried out with the address space of the memory regarded as a two-dimensional space in which the vertical axis indicates the vertical coordinate of an image signal, whereas the horizontal axis indicates the level of an edge component. Therefore, edge components corresponding to the video content of a captured image, that is, the in-focus state can be visually ascertained.

The bank memory unit 206 includes the waveform memory Bank1 207 and the waveform memory Bank2 208. The waveform memory Bank1 207 and the waveform memory Bank2 208 are switched for each field (or frame) of image signals so as to be accessed from either the memory controller A 204 or the memory controller B 211.

It is assumed here that the control is exercised so that when the waveform memory Bank1 207 is accessed from the controller A 204, the waveform memory Bank2 208 in another bank is accessed from the memory controller B 211. Then, in the next image field (or frame), the access relationships between the memory controllers and the waveform memories are switched.

The waveform memory Bank2 208 is equivalent to the waveform memory Bank1 207, and used for bank control.

A post-processing unit 209 includes the image synthesizing circuit 210 and the memory controller B 211. The image synthesizing circuit 210 synthesizes image signals with a waveform image on the basis of edge information read out from the bank memory unit 206 by the memory controller B 211 to display the synthesized image on the first display unit 622 and/or the second display unit 623. FIG. 1A described later represents an aspect in which a display of image signals is provided over the entire screen, whereas a waveform image of edge components is superimposed on the lower side of the screen. Although not particularly shown in the figure, in order to make the waveform image more visible, a background color (such as a semi-transmissive black) may be displayed on the background of the waveform image. In such a case, the visibility of the waveform image can be improved by superimposing a background color on image signals and then superimposing a waveform image on the background color.

The memory controller B 211 reads out edge information written by the memory controller A 204 in the waveform memory Bank1 207 or the waveform memory Bank2 208, and supplies the read edge information to the image synthesizing circuit 210. The image synthesizing circuit 210 generates, from the edge information, a waveform image representing the levels and extracted positions of the edge components, and aligns and synthesizes the waveform image with a captured image to display the aligned and synthesized image on the first display unit 622 and/or the second display unit 623.

The system control unit 611 exercises various types of control in the video control unit 615. For example, the system control unit 611 controls the center frequency and gain for edge components extracted in the edge extraction circuit 203, exercises gain control in the waveform control unit 205, controls whether or not to synthesize a waveform image of edge components in the image synthesizing circuit 210, and controls the synthesis position with respect to image signals.

The edge extraction circuit 203 applies a finite impulse response) FIR-type bandpass filter with a structure capable of adjusting frequency characteristics and passband gain to luminance components in a predetermined direction (assumed to be a horizontal direction here) of an image to extract edge components. It is to be noted that edge components may be extracted by other methods.

In an exemplified configuration of the edge extraction circuit 203, shown in FIG. 7, an input image signal 701 is input to a D-FF (Delay type Flip Flop) 702. The D-FF 702 latches the input image signal 701 in accordance with a pixel clock for image signals, and passes the input image signal 701 to a D-FF 703 at the next stage. The output signal of the D-FF 702 is delayed by one pixel clock with respect to the input signal. The pixel clock here refers to a display clock for the first display unit 622, on the order of 13.5 to 33.75 MHz, depending on the specifications (display resolution) of a liquid crystal display panel or the like.

D-FF 703 to 709 have the same configuration as that of the D-FF 702, which latch data from the previous stage in accordance with a pixel clock for image signals, delay the data by one pixel clock, and output the delayed data to the subsequent stage. Among 9 taps from Y(−4) to Y(4) of the FIR type horizontal filter, 3 taps are combined here depending on the frequencies of extracted edge components. Specifically, with the center tap Y(0) in common, the combination of the previous and subsequent taps is changed to consider the following combinations:

Y(−1), Y(0), Y(1)
Y(−2), Y(0), Y(2)
Y(−3), Y(0), Y(3)
Y(−4), Y(0), Y(4)

In addition, in each combination, the taps which are not selected are considered to be selected, but have a tap coefficient set at zero. The frequency band extracted an edge is made variable by controlling the combination of the taps as described above.

It is to be noted that the tap coefficients and DC gain for the 3 taps combined are defined as follows in the present embodiment:

Tap Coefficient of Center Tap: $2\alpha$
Tap Coefficient of Previous and Subsequent Tap: $-\alpha$
DC Gain: $2\alpha-\alpha-\alpha=0$ A gain adjustment signal 710 is supplied from the system control unit 611, which controls the level of the emphasized frequency band for the FIR type horizontal filter of the edge extraction circuit 203. The gain adjustment signal 710 here is a 4-bit signal, so as to switch the synthesized gain level in 16 stage, specifically with $\alpha=15$: maximum gain to $\alpha=0$: OFF (minimum gain).

The case of $\alpha=0$ is not shown in FIG. 7 for the sake of convenience, in which image signals are not to be subjected to processing through (pass though) the FIR-type horizontal filter.

A frequency adjustment signal 711 is supplied from the system control unit 611, which controls the center frequency of edge components extracted by the edge extraction circuit 203. The frequency adjustment signal 711 here is a 2-bit signal, so as to make the center frequency switchable among four frequencies.

A signal selector 712 is controlled by the frequency adjustment signal 711, which selects and outputs one input in response to the frequency adjustment signal 711 to switch the center frequency extracted by the edge extraction circuit 203. Specifically, the 2-bit frequency adjustment signal 711 and the center frequency (emphasized center frequency) output from the edge extraction circuit 203 have the following relationship:

With the sampling frequency: f (MHz),
Frequency Adjustment Signal 711: Emphasized Center Frequency (fc)
00: fc=f/2 MHz
(using the center tap and the previous and subsequent taps adjacent to the center tap)
01: fc=f/4 MHz
(using the center tap and the taps located with the one previous or subsequent tap skipped from the center tap)
10: fc=f/6 MHz
(using the center tap and the taps located with two previous or subsequent taps skipped from the center tap)
11: fc=f/8 MHz
(using the center tap and the taps located with three previous or subsequent taps skipped from the center tap)

The signal selected by the signal selector 712 is output to the memory controller A 204.

Furthermore, FIGS. 8A to 8D schematically show frequency characteristics of the edge extraction circuit 203 at f=13.5 MHz. FIGS. 8A to 8D respectively correspond to the cases in which the frequency adjustment signal 711 is 00, 01, 10, and 11, and in the cases, the center frequency fc (MHz) is f/2, f/4, f/6, and f/8.

Captured image signals are input to the edge extraction circuit 203 for each horizontal line to extract edge components in the horizontal direction. Then, the memory controller A 204 and the waveform control unit 205 exercise the memory access control described above in response to the levels (amplitudes) of the extracted edge components. This operation is repeated for each line to write, into the waveform memory Bank1 207 or the waveform memory Bank2 208, values reflecting the levels of edge components for each line in the horizontal direction with respect to image signals for one field or one frame. For example, in a case in which there is a vertical line in the vertical direction in an image, the longer the line is, the more frequently the edge component with the same amplitude is extracted at the same horizontal position. In a case in which the same level of edge component is extracted at the same position more than once, the more frequently the edge component is extracted, the more frequently the same address of the waveform memory is accessed, thereby increasing the data value at the address through the access control described above. As a result, the corresponding mark will be indicated with a higher luminance. The length of the mark indicating the magnitude of the level does not depend on the frequency. It is to be noted that in the case of carrying out detected vertical display, similar operation is carried out for each vertical line.

FIGS. 1A and 1B schematically show an example of the display screen in a case in which the high-vision digital video camera according to the present embodiment superimposes edge components of image signals as a waveform on a captured image displayed on the first display unit 622 and/or the second display unit 623. In the present embodiment, in a case in which manual focusing is set via the input operation unit 613, for example, in an image capturing mode, a waveform image of edge components as an assist indication is superimposed on a captured image. In the image capturing mode, through images are sequentially displayed on the first display unit 622 and/or the second display unit 623, which function as electronic viewfinders. As described above, on the basis of the direction and distance of a focal shift in response to the operation of adjusting the focal length via a switch, a lever or the like included in the input operation unit 613, the system control unit 611 controls the lens driving unit 608 and changes the focal length of the lens unit 601.

In the "horizontal display" in FIG. 1A, a waveform indicating the signal levels of edge components in the horizontal direction of a captured image is displayed on the lower side of the screen in a case in which it is assumed that the display screen is horizontally long with an aspect ratio of 16:9. For example, in a case in which the photographer carries out manual focusing operation, an edge portion of the object is being focused as the camera is coming into focus, thereby resulting in an increase in the level of an edge component extracted at the position. Therefore, the levels of edge components to be displayed as a waveform on the lower side of the screen will be also displayed with large magnitudes (with high marks). The desired object can be focused by carrying out the manual focusing operation while looking through the electronic viewfinder in such a way that the mark for the waveform image corresponding to the desired object is displayed with the largest magnitude. In the horizontal display, a waveform image of edge components is superimposed with its horizontal position aligned with that of a captured image, and the degree of in-focus can be thus checked for individual objects contained in an image while observing a waveform display and a captured image in the vertical direction.

In addition, the display control exercised here in such a way that when a captured image is observed in the vertical direction, the more frequent the level of the same edge component is, the higher the display strength (regarded as the intensity of the luminance) of the waveform display.

Furthermore, in the "vertical display" in FIG. 1B, a waveform indicating the levels of edge components in the vertical direction of a captured image is displayed on the right-hand edge of the screen in a case in which it is assumed that the display screen is horizontally long with an aspect ratio of 16:9. In the same way as in the horizontal display, the photographer can focus on the desired object by carrying out the manual focusing operation in such a way that the mark for the waveform image corresponding to the desired object is displayed with the largest magnitude. In the vertical display, a waveform image of edge components is superimposed with its vertical position aligned with that of a captured image, and the degree of in-focus can be thus checked for individual objects contained in an image while observing a waveform display and a captured image in the horizontal direction.

On an effective display surface 102, a captured image and various pieces of image capturing information, a waveform image of edge components as an assist indication for manual focusing, etc. are displayed.

In the horizontal display shown in FIG. 1A, sides 106 parallel to the vertical direction of the effective display surface 102 and obliquely shown sides 107, which belong to an object 103 in the shape of a rectangular parallelepiped, are extracted as edges in the horizontal direction. Strictly speaking, while it is not necessarily the case that the slope of an edge of the captured object changes the strength of the edge component, it is assumed here for simplicity that the sides 106 have higher levels of edge components as compared with the sides 107 and a side 110. Therefore, marks 108 of the corresponding waveform image are also displayed with larger magnitudes (larger lengths). In addition, it is assumed that the levels of edge components in the horizontal direction for the sides 107 are not as high as those of the sides 106, and marks 109 of the corresponding waveform image are also displayed with smaller magnitudes. Furthermore, the right and left marks 109 are related to the parallel sides 107, thus have equal heights with levels of extracted edge components equal to each other. However, the right marks reflect edge components extracted for the two sides 107 in the bottom plane and top plane of the object 103, and thus with a higher frequency of extractions, exhibits a higher luminance than the left marks.

Furthermore, a side 110 of a triangle object 104 with a base parallel to the effective display surface 102 and at an equal distance to the distance to the object 103 is extracted as an edge in the horizontal direction. Then, a mark 111 is displayed at a horizontal position corresponding to the side 110.

In addition, in a case in which the vertical display is carried out with the image capturing conditions in FIG. 1A, the waveform image is as shown in FIG. 1B. In the vertical display, horizontal sides 119 and 123 of the objects 103 and 104 have high levels of edge components for simplicity, as in the case of the horizontal display. Therefore, corresponding marks 121 and 116 are displayed with large magnitudes (large lengths). Furthermore, marks 122 and 129 are displayed for oblique sides 120 and 110.

Also in FIG. 1B, for the right and left marks 122 of the waveform image, the left marks are displayed with a higher luminance (because of the larger number of reflected sides 120). In addition, sections of the marks 122 overlapped with the marks 129 are displayed with a higher luminance.

The horizontal display and the vertical display can be configured, for example, in such a way that switching between the horizontal display and the vertical display is carried out for display each time a switching key included in the input operation unit 613 is pressed. Alternatively, both the horizontal display and the vertical display may be carried out. Furthermore, it is not necessary to superimpose the waveform image of the edge components on the captured image, and the waveform image may be displayed around the capture image unless the captured image is a full-screen display. Also in this case, it goes without saying that the position of the waveform image is related to the position of the captured image.

The waveform display operation in the manual focusing described above will be described with reference to a flowchart of FIG. 9. The processing shown in this flowchart is carried out when a manual focusing mode is set via the input operation unit 613 in a shooting mode. In this condition, so-called through images (also referred to as EVF images or EE (Electronic to Electronic) images) are sequentially displayed on the first display unit 622 and/or the second display unit 623, which function as EVFs.

The system control unit 611 instructs the video control unit 615 to start assist indication processing for manual focusing. This causes the edge extraction circuit 203 to start to extract edge components (S101). Further, the memory controller A 204 and the waveform control unit 205 access addresses of the waveform memory (the waveform memory Bank2 208 here) in the bank memory 206 in response to the extraction result obtained by the edge extraction circuit 203 to generate a waveform (S103).

In the preprocessing unit 202, the edge component extraction and the waveform generation processing are sequentially carried out for one field (or one frame) of image signals (S101, S103, S105). Then, when the waveform generation processing is completed for one field (or one frame), the memory controller B 211 reads out data from the waveform memory Bank2 208 to generate a waveform image. It is to be noted that the memory controller B 211 may supply the read data to the image synthesizing circuit 210 in such a way that the waveform image may be generated by the image synthesizing circuit 210. Then, the image synthesizing circuit 210 superimposes the waveform image on an EVF image to display the superimposed image on the first display unit 622 and/or the second display unit 623 (S107). On the other hand, the memory controller A 204 carries out bank switching processing for the waveform memory to be used for the next field (or frame) (S109). In practice, after S105, a series of processing steps of the reading of data and the generation and display of a waveform image carried out by the memory controller B 211 are carried out in parallel with the bank switching and the edge extraction processing for the next field (or frame) carried out by the memory controller B 204. As described above, when a waveform image of edge components representing an in-focus state at the time is displayed along with an EVF image, the photographer can carry out focusing easily through manual focusing while looking through the EVF.

As described above, according to the present embodiment, as an assist indication for supporting the focusing operation through manual focusing, in the display screen for captured images, the levels of edge components extracted from captured image signals are displayed as a waveform to correspond to the position of an object in the captured image. Therefore, when the focus adjustment is made so that the levels displayed as a waveform reaches the highest level, the focusing through manual focusing can be easily carried out. In this case, since the levels of the edge components are displayed at the position corresponding to the position of the object, it is possible to figure out at which position of the captured image the edge components have been extracted, and even in a case in which there are multiple objects at different distances, a desired object is easily focused. Furthermore, since captured images are not brought into black-and-white images as in peaking indications, the focusing operation can be carried out while figuring out what image the focused portion is. Moreover, it is possible to display as a waveform the levels of edge components in different directions of an image, such as in the horizontal direction and the vertical direction. Thus, the focusing operation is further facilitated by switching the display depending on the orientations of edges belonging to an object.

Second Embodiment

Next, a second embodiment according to the present invention will be described. An image capturing apparatus according to the present invention has the same configuration as the first embodiment except for the preprocessing unit 202 of the video control unit 615. Thus, redundant description will be omitted, and the difference will be intensively described.

Figure 3:
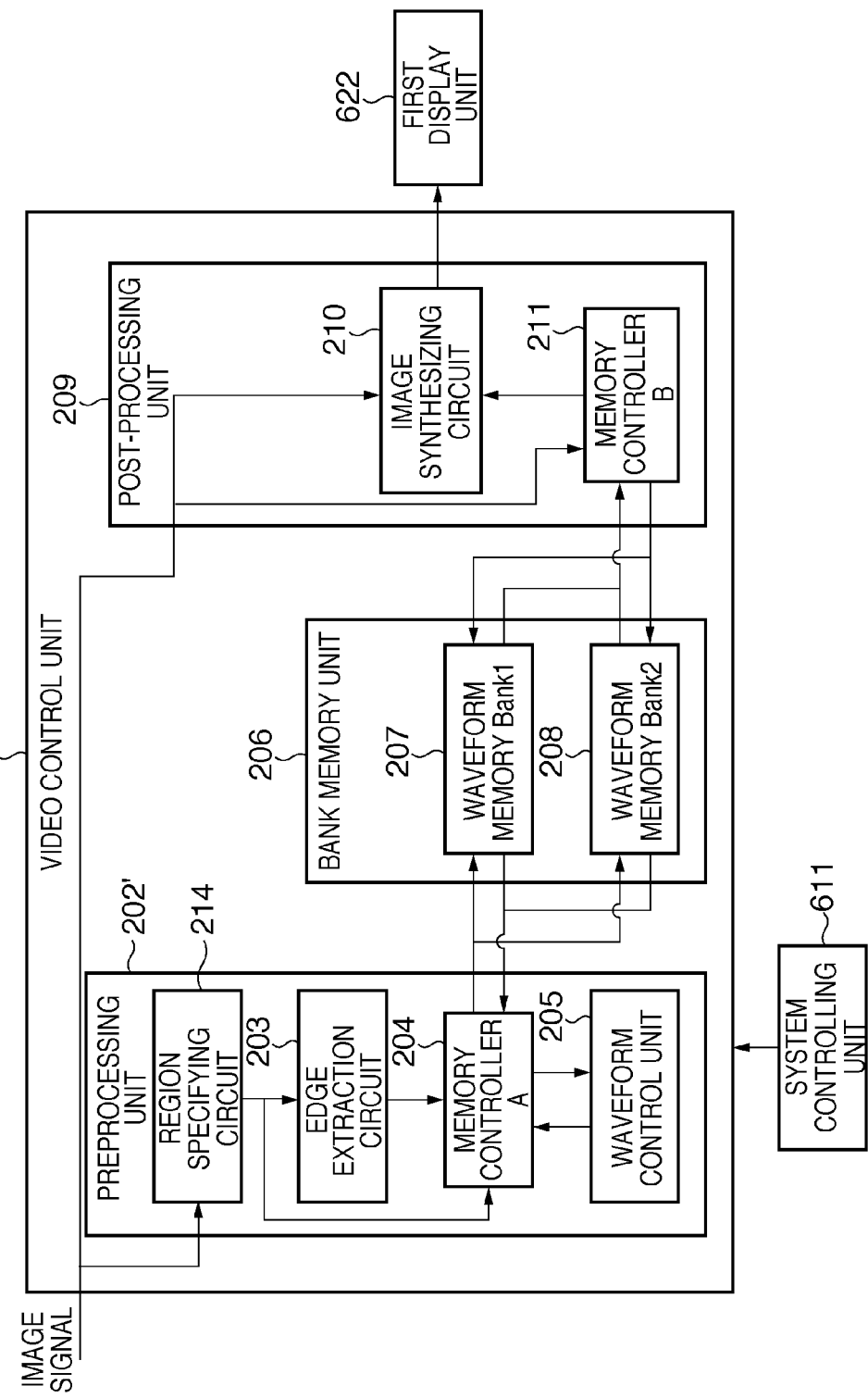
FIG. 3 is a block diagram a block diagram illustrating a configuration example regarding waveform display processing of a video control unit in a high-vision digital video camera according to another embodiment of the present invention.

The present embodiment substantially differs from the first embodiment in that edge components are extracted from a partial region of a captured image. A preprocessing unit 202' of a video control unit 615' in the present embodiment has a region specifying circuit 214', as shown in FIG. 3.

The region specifying circuit 214' supplies only image signals in a specified region among captured image signals to an edge extraction circuit 203 and a memory controller 204.

Figure 4A:
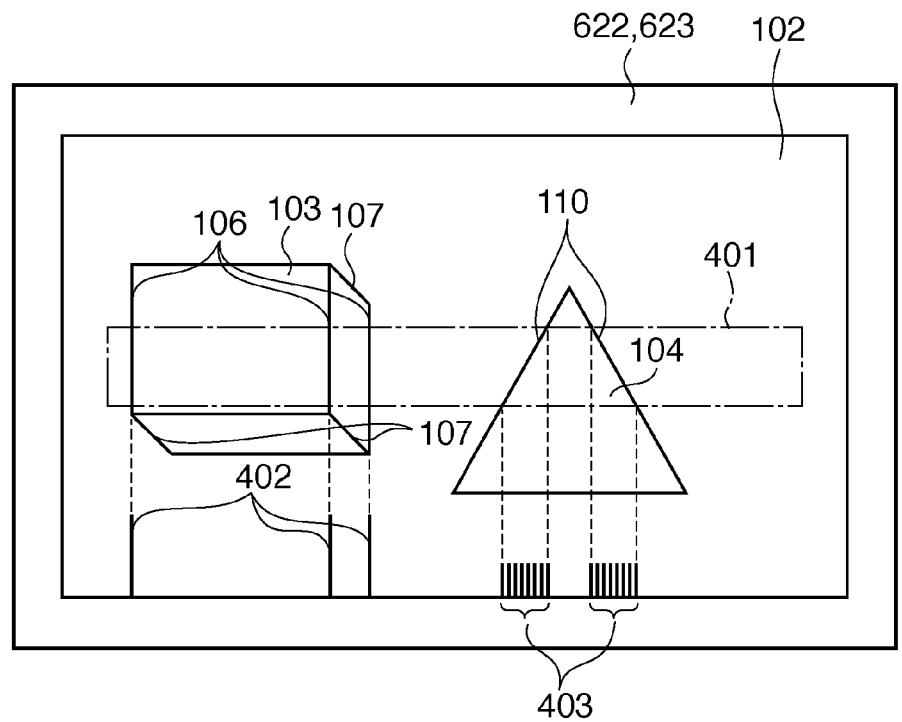
FIGS. 4A and 4B are diagrams schematically illustrating a screen with the levels of edge components of captured image signals displayed as a waveform along with a captured image, in a high-vision digital video camera as an example of an image capturing apparatus according to another embodiment of the present invention.
Figure 4B:
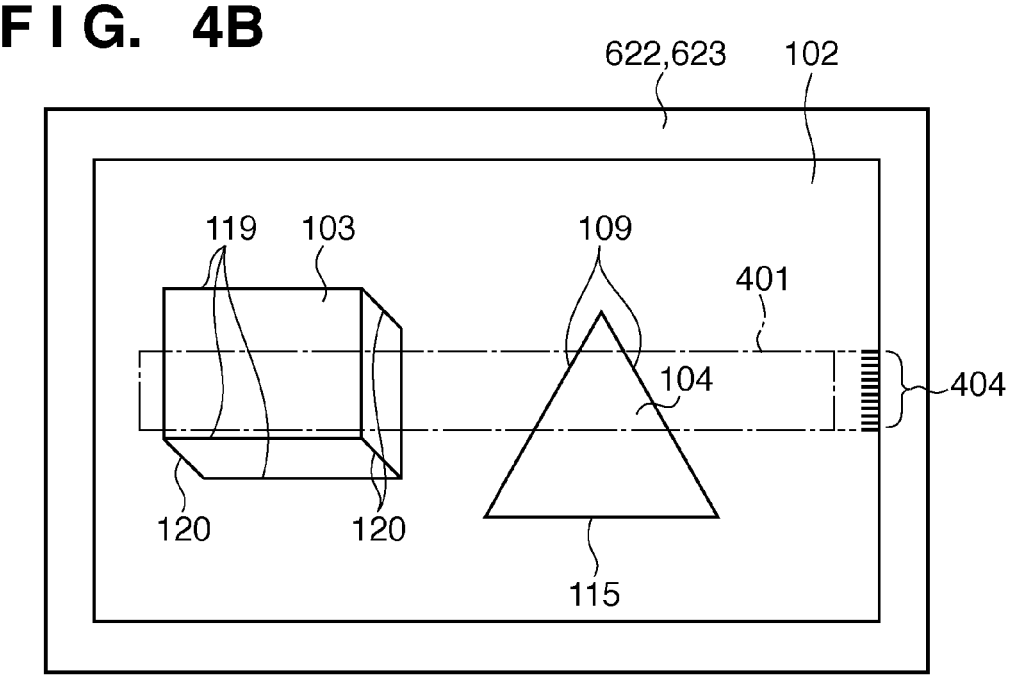

FIGS. 4A and 4B schematically an example of the display screen in a case in which the high-vision digital video camera according to the present embodiment superimposes edge components of image signals as a waveform on a captured image displayed on a first display unit 622 and/or a second display unit 623. Also in the present embodiment, in a case in which manual focusing is set via the input operation unit 613, for example, in an image capturing mode, a waveform image of edge components as an assist indication is superimposed on a captured image.

FIGS. 4A and 4B show examples of "horizontal display" and "vertical display" as in the case of FIGS. 1A and 1B. The present embodiment differs from the first embodiment in a region from which edge components are extracted, that is, in that waveform display of edge components is carried out for edge components extracted from image signals contained in a rectangular specified region 401 indicated by an alternate long and short dash line in the figures.

The specified region 401 may be ascertained by the photographer with a frame or the like always superimposed on a captured image, or an indication representing the position of the specified region 401 may be provided in the screen, for example, only when the specified region is set or when an input operation unit 613 issues a display instruction. In addition, while the size and position of the specified region 401 are not particularly limited, it is assumed here that the size and position of the specified region 401 are set to the position and size shown in FIGS. 4A and 4B as initial settings. In a case in which the photographer is allowed to set the specified region, the size and position of a rectangular frame which can be changed in size and position can be adjusted with the use of direction keys or the like and set by pressing a set button or the like, as generally used for specifying a rectangular region in an image. It is to be noted that indications such as a GUI for setting the specified region and a frame representing the specified region set can be synthesized with a captured image for superimposition in an image synthesizing circuit 210 described later, as in the case of a waveform image of edge components. The data regarding these indications can be supplied from the system control unit 611 to the image synthesizing circuit 210.

In the example of FIG. 4A, at positions corresponding to the horizontal positions of sides 106 of an object 103 on an effective display surface 102, marks 402 representing the levels of edge components corresponding to the sides 106 are displayed, as in the case of the example in FIG. 1A. The marks 402 have a height (length) equal to that of the marks 108 in the first embodiment, but a lower luminance. This is because the length of the sides 106 contained in the specified region 401 in the present embodiment is less than in the first embodiment, and the access frequency (number of times) for an address corresponding to the amplitude is thus less than in the first embodiment. Furthermore, since the specified region 401 contains none of sides 107 of the object 103, the waveform image contains marks (109 in FIG. 1A) for edge components corresponding to the sides 107. In addition, with respect to an object 104, marks 403 are displayed only for ranges of sides 110 contained in the specified region 401. Also in FIG. 4B which shows a vertical display corresponding to FIG. 4A, marks 404 are displayed only for ranges contained in the specified region 401.

Figure 5A:
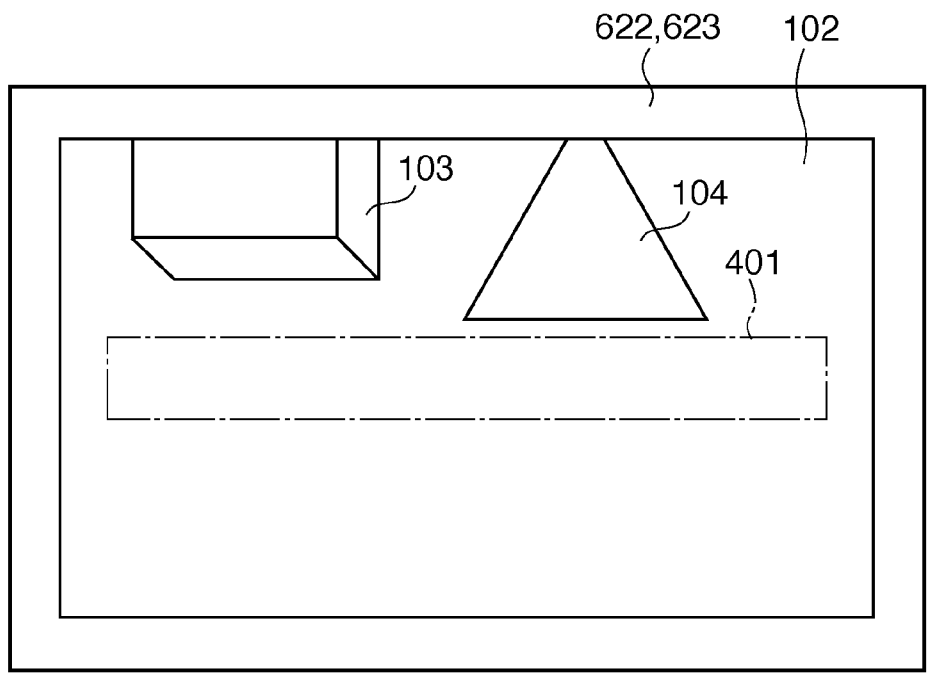
FIGS. 5A and 5B are diagrams schematically illustrating a screen with the levels of edge components of captured image signals displayed as a waveform along with a captured image, in a high-vision digital video camera as an example of an image capturing apparatus according to another embodiment of the present invention.
Figure 5B:
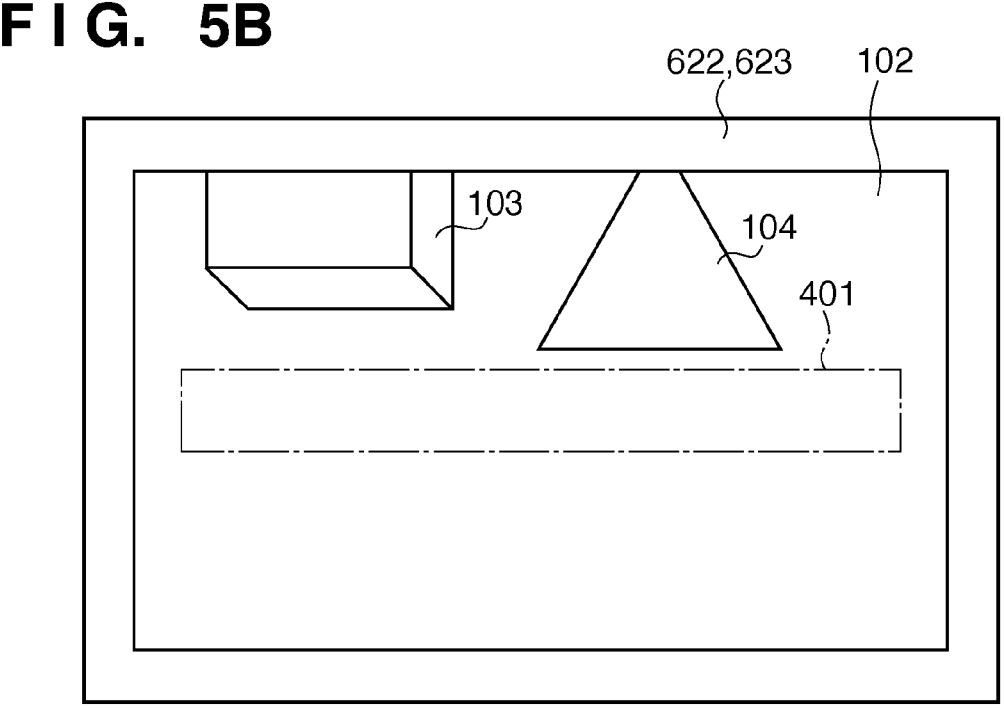

When the objects or the camera is moved to go into a state in which none of the object 103 and the object 104 is contained in the specified region 401, there will be no mark contained in a waveform image, as shown in FIGS. 5A and 5B.

According to the present invention, the camera is configured to extract edge components only in the specified region. Therefore, in addition to the advantageous effects in the first embodiment, the photographer carries out framing so that an object desired to be focused through manual focusing is contained in the specified region, thereby allowing an assist indication for the desired object to be used, and focusing can be thus easily carried out. The present embodiment is particularly effective, for example, in a case in which the case of carrying out waveform display of edge components based on the entire screen has an unclear correspondence between an object and a waveform, such as in a case in which various objects are included in a captured image. Furthermore, when the photographer is allowed to specify the partial region, focusing through manual focusing operation can be more easily carried for any object without moving the frame.

Third Embodiment

Figure 10:
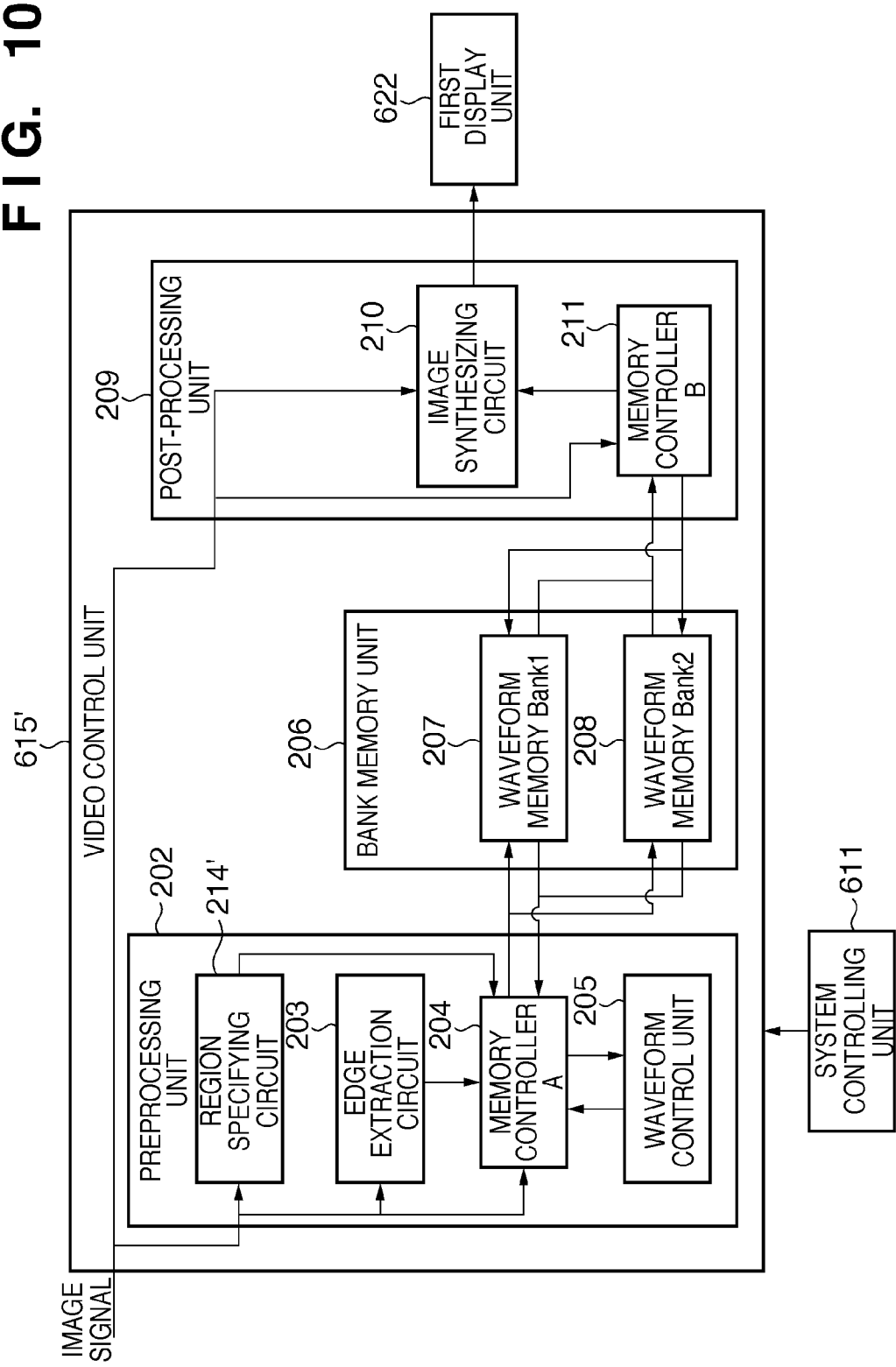
FIG. 10 is a block diagram illustrating a configuration example regarding waveform display processing by a video control unit in a high-vision digital video camera according to a third embodiment of the present invention.

FIG. 10 is a block diagram a block diagram illustrating a configuration example of a high-vision digital video camera provided with a manual focusing function, as an example of an image capturing apparatus according to a third embodiment of the present invention. As is clear from comparison with FIG. 3, the image capturing apparatus according to the present invention has the same configuration as the second embodiment except for the preprocessing unit 202 of the video control unit 615'. Thus, redundant description will be omitted, and the difference will be intensively described.

A region specifying circuit 214' according to the present embodiment has the function of providing, in accordance with a region specifying signal, a memory controller A 204 with information on a region specified via the system control unit 611 in an image represented by captured image signals. The region which can be specified by the system control unit 611 through the region specifying circuit 214' is not particularly limited in size, number, or position. It is assumed here that three rectangular regions (specified regions 114, 115, 116) indicated by alternate long and short dash lines are set in FIGS. 11A and 11B.

In a case in which the photographer is allowed to set the specified region, the size and position of a rectangular frame which can be changed in size and position can be adjusted with the use of direction keys or the like and set by pressing a set button or the like, as generally used for specifying a rectangular region in an image. It is to be noted that indications such as a GUI for setting the specified region and a frame representing the specified region set can be synthesized with a captured image for superimposition in an image synthesizing circuit 210 described later, as in the case of a waveform image of edge components. The data regarding these indications can be supplied from the system control unit 611 to the image synthesizing circuit 210.

Furthermore, the memory controller A 204 adds flag information to extracted edge components and writes the edge components with the flag information in a waveform memory, for a region specified in accordance with a region specifying signal from the region specifying circuit 214'. Then, a memory controller B 211 reads out the edge components including the flag information, and on the basis of the flag information, the image synthesizing circuit 210 exercises control in such a way that the display format (for example, display color) of edge information for the specified region is different from that of edge information for the region other than the specified region.

After the processing for one field (or one frame) is completed, the memory controller B 211 reads out data (and flag information) at each address, and generates a waveform image on the basis of the read address and data as well as the flag information. In the present embodiment, in the case of the horizontal display shown in FIG. 11A, access control is exercised with the address space of the memory regarded as a two-dimensional space in which the horizontal axis indicates the horizontal coordinate of an image signal, whereas the vertical axis indicates the amplitude (level) of edge information. Therefore, edge components corresponding to the video content of a captured image, that is, the in-focus state, can be visually ascertained.

Furthermore, on the basis of the flag information, edge components corresponding to the specified region are different in display format from edge components for the other region. Thus, which region the edge components correspond to can be easily ascertained.

In a case which the read edge information has flag information, the image synthesizing circuit 210 displays the information so that the edge information with the flag information can be visually distinguished from edge components without flag information.

Figure 11A:
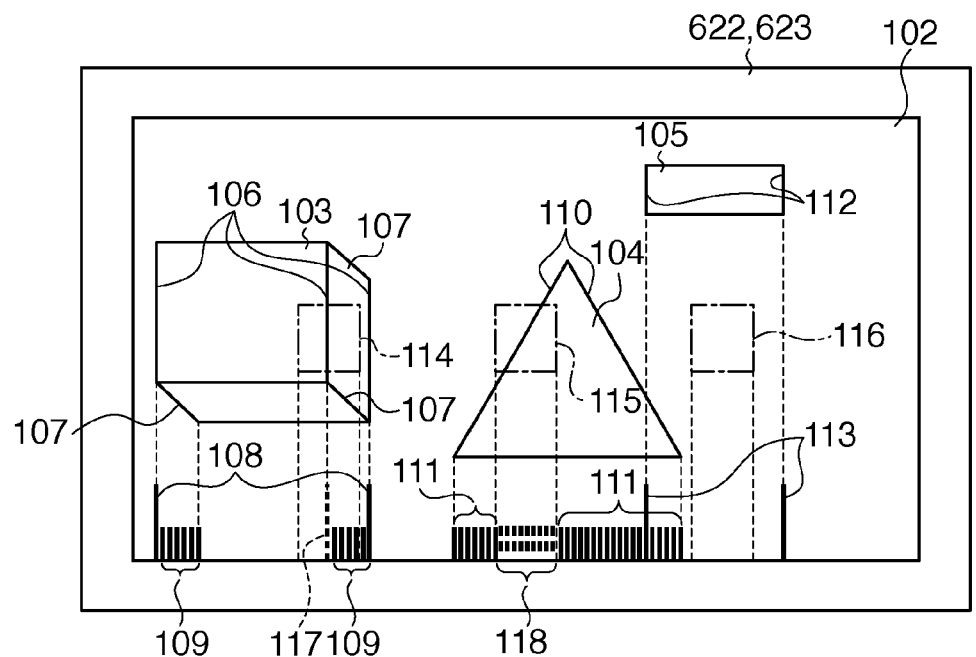
FIGS. 11A and 11B are diagrams schematically illustrating a screen with the levels of edge components of captured image signals displayed as a waveform along with a captured image, in a high-vision digital video camera as an example of an image capturing apparatus according to the third embodiment of the present invention.

FIG. 11A described later represents an aspect in which a display of image signals is provided over the entire screen, whereas a waveform image of edge components is superimposed on the lower side of the screen. FIG. 11A is provided as a black-and-white drawing, which schematically represents an aspect a waveform display of edge components extracted in the specified regions 114, 115, 116 is displayed in a different color from a waveform display of edge components extracted in the region other than the specified regions. The display color of the edge components for the specified regions can be specified from the system control unit 611. In addition, while waveform displays corresponding to an edge over the specified region and the other region will be displayed at the same position in the horizontal direction, sections with different levels can be visually recognized, whereas portions with the same level can be synthesized for display in the image synthesizing circuit 210 in order of priority in accordance with control from the system control unit 611.

The system control unit 611 instructs the region specifying circuit 214' to specify a region, controls the center frequency and gain for edge components extracted in an edge extraction circuit 203, or exercises gain control in a waveform control unit 205. Furthermore, the system control unit 611 also controls whether or not to synthesize a waveform image of edge components in the image synthesizing circuit 210, controls the synthesis position with respect to image signals, or controls the waveform display formats corresponding to a specified region and the other region.

Figure 11B:
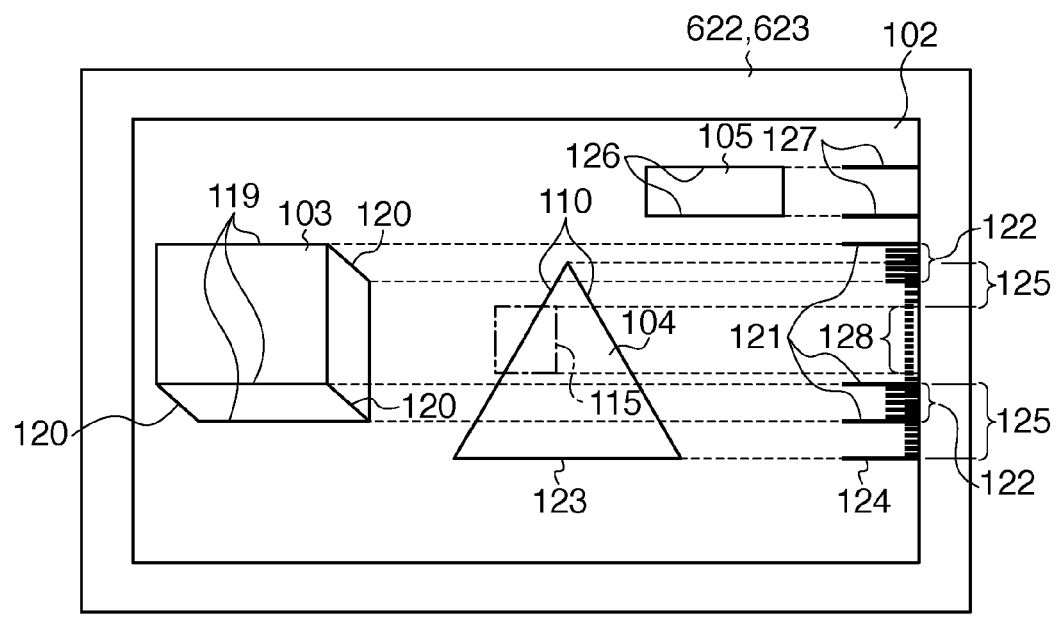

FIGS. 11A and 11B show schematically an example of the display screen in a case in which the high-vision digital video camera according to the present embodiment superimposes edge components of image signals as a waveform on a captured image displayed on a first display unit 622 and/or a second display unit 623.

In FIG. 11A, a mark 117 corresponding to a side 106 with a section contained in the specified region 114 is displayed in a different way from marks 108. It is to be noted that while the mark 117 is expressed by a dotted line in FIG. 11A because it is not possible to express the difference in color, in practice any visually distinguishable display format can be employed, such as different display colors, flashing, or varied luminance levels.

For example, the marks 117 and 118 reflecting edge components in the specified regions 114 and 115 are displayed in "red", whereas the marks 108, 109, 111, 113 reflecting edge components extracted in the region other than the specified regions are displayed in "green". This allows the degree of in-focus for a region of interest to be easily checked while checking the degree of in-focus for the entire captured image.

It is to be noted that while the mark 117 is a mark reflecting both the edge component extracted from the specified region 114 and the edge component extracted from a region other than the specified region, it is assumed here that the setting is made for preferentially displaying the edge component in the specified region 114.

In addition, it is assumed that the levels of edge components in the horizontal direction for the sides 107 are not as high as those of the sides 106, and the marks 109 of the corresponding waveform image are also displayed with smaller magnitudes. Furthermore, the right and left marks 109 are related to the parallel sides 107, and thus have heights equal to the levels of extracted edge components equal to each other. However, the right marks reflect edge components extracted for the two sides 107 in the bottom plane and top plane of the object 103, and thus with a higher frequency of extractions, exhibits a higher luminance than the left marks.

Furthermore, a side 110 of a triangle object 104 with a base parallel to the long side of the effective display surface 102 and at an equal distance to the distance to the object 103 is extracted as an edge in the horizontal direction. Then, marks 111 and 118 are displayed at a horizontal position corresponding to the side 110.

While both the marks 111 and 118 are marks corresponding to the side 110, the marks 118 correspond to a section of the side 110 contained in the specified region 115, and is thus different from the marks 111 in display format.

An object 105 has a rectangular shape with long sides parallel to the long side of the effective display surface 102 and short sides 112 parallel to the short side of the effective display surface 102, and is assumed at an equal distance to the distance to the objects 103, 104. Marks 113 for edge components corresponding to the short sides 112 are displayed. It is to be noted that a section of the mark 113 corresponding to the left side of the short sides 112, which is overlapped with the mark 111 corresponding to the side 110 of the object 104, is displayed with a higher luminance.

While the positions of the specified regions 114 to 116 may or may not displayed, the images indicating the positions (for example, frames as shown in FIG. 11A) can be superimposed on a captured image and presented to the photographer as a mark of a place for focusing. The display of the specified regions can be carried out by supplying information on the specified regions from the system control unit 611 or the region specifying circuit 214' to the image synthesizing circuit 210.

FIG. 11B shows vertical display carried out in a case in which there is one specified region 115 with a captured image of the same objects as in FIG. 11A. As in the case of horizontal display, it is assumed for simplicity that edge components for horizontal sides 119, 123, and 126 of the objects 103 to 105 have high levels. Therefore, corresponding marks 121, 124, and 127 are displayed with large magnitudes (large lengths). In addition, marks 122, 125, and 128 are displayed for oblique sides 120 and 110.

While both the marks 125 and 128 are marks reflecting edge components for the sides 110, the marks 128 reflecting sections of the sides 110 contained in the specified region 115 are displayed in a different way from the marks 125.

Again as in the case of the horizontal display, for example, the marks 128 reflecting an edge component in the specified region 115 are displayed in "red", whereas the marks 121, 122, 124, 125 reflecting edge components extracted in the region other than the specified region are displayed in "green". This allows the degree of in-focus for a region of interest to be easily checked while checking the degree of in-focus for the entire captured image.

Also in FIG. 11B, as for the right and left marks 122 of the waveform image, the left marks are displayed with a higher luminance (because of the larger number of reflected sides 120). In addition, sections of the marks 122 overlapped with the marks 125 are displayed with a higher luminance than the sections with no overlap with the marks 125.

It is to be noted that, while it is assumed that there is one specified region in the example of FIG. 11B for simplicity, it goes without saying that there may be multiple regions.

The horizontal display and the vertical display can be configured, for example, in such a way that switching between the horizontal display and the vertical display is carried out for display each time a switching key included in an input operation unit 613 is pressed. Alternatively, both the horizontal display and the vertical display may be carried out. Furthermore, it is not necessary to superimpose the waveform image of the edge components on the captured image, and the waveform image may be displayed around the capture image unless the captured image is a full-screen display. Also in this case, it goes without saying that the position of the waveform image is related to the position of the captured image.

It is to be noted that the waveform display of edge components for the entire captured image is carried out in the examples of FIGS. 11A and 11B, in such a way that the marks reflecting edge components extracted in the specified region (s) in the waveform display can be visually distinguished from the other marks.

Figure 12A:
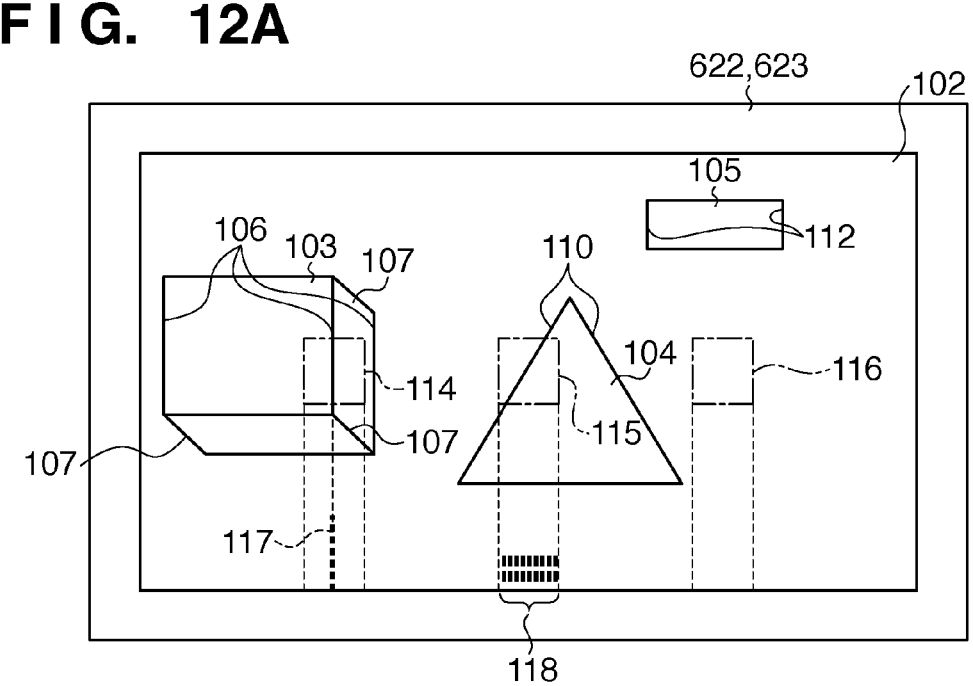
FIGS. 12A and 12B are diagrams schematically illustrating a screen with the levels of edge components of captured image signals displayed as a waveform along with a captured image, in a high-vision digital video camera as an example of an image capturing apparatus according to a modification example of the third embodiment of the present invention.
Figure 12B:
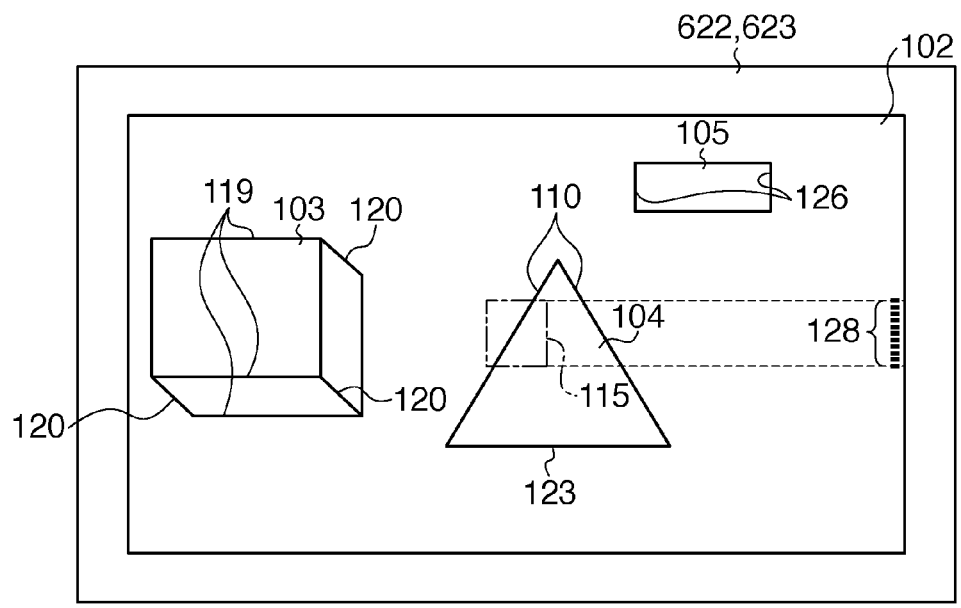

However, even when the waveform display based on only edge components extracted in a specified region is carried out as shown in FIGS. 12A and 12B, the degree of in-focus in the specified region can be easily distinguished. In this way the photographer can optionally and dynamically switch which display mode is carried out, and between the display mode in FIGS. 11A and 11B and the display mode in FIGS. 12A and 12B, the function may be assigned to the input operation unit 613 or the like.

The waveform display operation in the manual focusing described above will be described with reference to a flowchart of FIG. 13. The processing shown in this flowchart is carried out when a manual focusing mode is set via the input operation unit 613 in a shooting mode. In this condition, so-called through images (also referred to as EVF images) are sequentially displayed on the first display unit 622 and/or the second display unit 623, which function as EVFs. Furthermore, it is assumed that there is at least one specified region in the captured image screen.

The system control unit 611 instructs the video control unit 615 to start assist indication processing for manual focusing. In this case, the system control unit 611 provides the region specifying circuit 214' with information on the specified region set. In response to the start instruction, the edge extraction circuit 203 starts to extract edge components (S201). Further, the memory controller A 204 and the waveform control unit 205 accesses addresses of a waveform memory (a waveform memory Bank2 208 here) in a bank memory 206, in response to the extraction result obtained by the edge extraction circuit 203 to generate a waveform (S203). In this case, the memory controller A 204 adds flag information to data at addresses corresponding to edge components extracted in the specified region provided by a region specifying signal from the region specifying circuit 214'.

In a preprocessing unit 202, the edge component extraction and the waveform generation processing are sequentially carried out for one field (or one frame) of image signals (S201 to S205). Then, when the waveform generation processing is completed for one field (or one frame), the memory controller B 211 reads out data from the waveform memory Bank2 208 and supplies the data to the image synthesizing circuit 210. Then, the image synthesizing circuit 210 generates a waveform image, and superimposes the generated waveform image on an EVF image to display the superimposed image on the first display unit 622 and/or the second display unit 623 (S207). In this case, the image synthesizing circuit 210 generates, for the data with the flag information added, a waveform image which can be visually distinguished from data without flag information. The correspondence between the flag information and the display format can be determined in advance.

On the other hand, the memory controller A 204 carries out bank switching processing for the waveform memory to be used for the next field (or frame) (S209). In practice, after S205, a series of processing steps of the reading of data and the generation and display of a waveform image carried out by the memory controller B 211 are carried out in parallel with the bank switching and the edge extraction processing for the next field (or frame) carried out by the memory controller B 204. As described above, when a waveform image of edge components representing an in-focus state at the time is displayed along with an EVF image, the photographer can carry out focusing easily through manual focusing while looking through the EVF. Furthermore, since a section of the waveform image reflecting edge components in the specified region is displayed so as to be visually distinguishable from the other section, the degree of in-focus in the specified region can be easily checked.

As described above, according to the present embodiment, as an assist indication for supporting the focusing operation through manual focusing, in the display screen for captured images, the levels of edge components extracted from captured image signals are displayed as a waveform to correspond to the position of an object in the captured image. Therefore, when the focus adjustment is made so that the levels displayed as a waveform reaches the highest level, the focusing through manual focusing can be easily carried out. In this case, since the levels of the edge components are displayed at the position corresponding to the position of the object, it is possible to figure out at which position of the captured image the edge components have been extracted, and even in a case in which there are multiple objects at different distances, a desired object is easily focused. In addition, since a section of the waveform image reflecting edge components in the specified region is displayed so as to be visually distinguishable from any other section, the degree of in-focus in the specified region can be easily checked. Furthermore, since captured images are not brought into black-and-white images as in peaking indications, the focusing operation can be carried out while figuring out what image the focused portion is. Moreover, it is possible to display as a waveform the levels of edge components in different directions of an image, such as in the horizontal direction and the vertical direction. Thus, the focusing operation is further facilitated by switching the display depending on the orientations of edges belonging to an object.

Fourth Embodiment

Next, a fourth embodiment of the present invention will be described. An image capturing apparatus according to the present invention has the same configuration as the third embodiment except for the waveform display format of edge components. Thus, redundant description will be omitted, and the difference will be intensively described.

The present embodiment substantially differs from the third embodiment in that waveform displays reflecting edge components extracted from specified regions of a captured image are displayed so as to be distinguishable for each specified region.

In writing, into a bank memory unit 206, edge components extracted in specified regions provided by region specifying signals from a region specifying circuit 214' a memory controller A 204 adds different pieces of flag information to each specified region.

Then, an image synthesizing circuit 210 generates a waveform image depending on the flag information. For example, depending on the presence or absence of flag information and the values for the flag information, a waveform image is generated which is composed of marks with different colors from each other. It is to be noted that as long as marks reflecting only edge components extracted in regions other than specified regions are visually distinguishable from marks reflecting edge components extracted in the individual specified regions, a waveform image may be generated and/or displayed by a method other than using different colors.

Figure 14A:
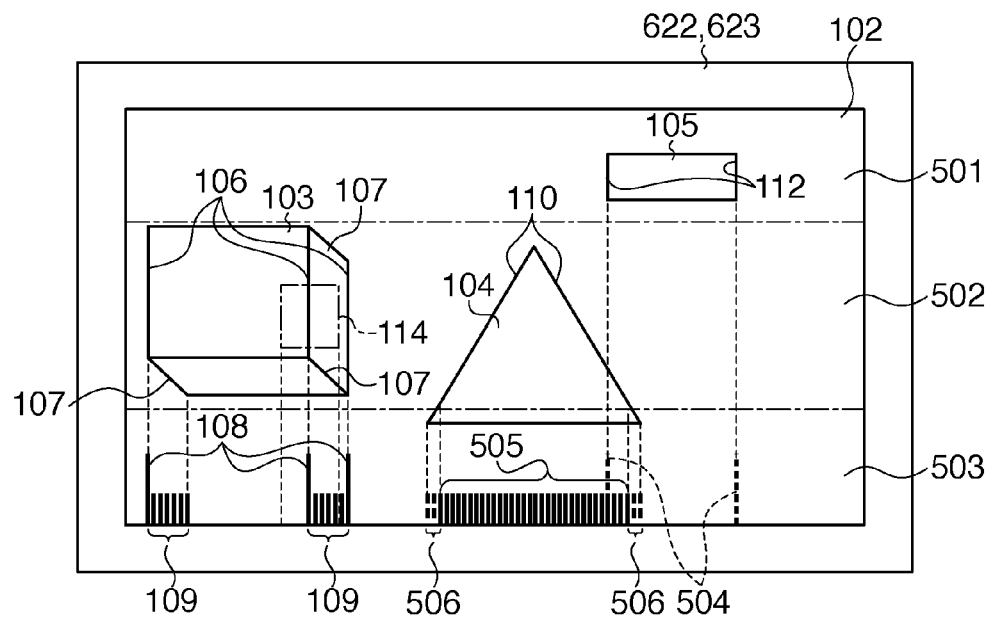
FIGS. 14A and 14B are diagrams schematically illustrating a screen with the levels of edge components of captured image signals displayed as a waveform along with a captured image, in a high-vision digital video camera as an example of an image capturing apparatus according to a fourth embodiment of the present invention.
Figure 14B:
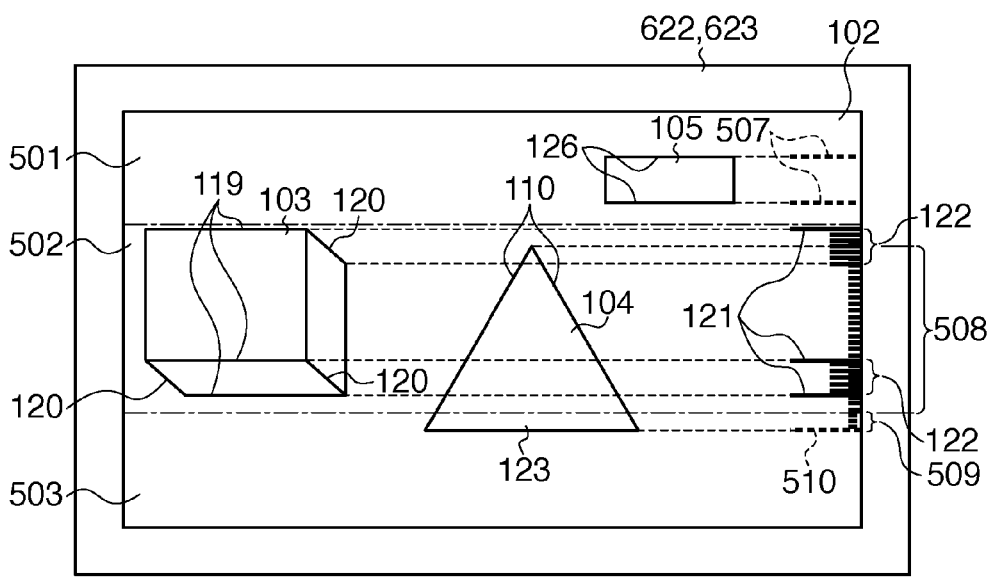

FIGS. 14A and 14B show examples of "horizontal display" and "vertical display", as in FIGS. 11A and 11B described in the third embodiment. In the examples of FIGS. 14A and 14B, it is assumed that specified regions 501, 502, 503 are set, which are obtained by dividing the entire captured image screen into three in the vertical direction. It is to be noted that as described in the third embodiment, the specified regions are not particularly limited in size, number, and position, and it is not necessary to divide the entire captured image screen into specified regions as in FIGS. 14A and 14B.

In the example of FIG. 14A, a object 103 is entirely contained in the specified region 502, and corresponding marks 108 and 109 are thus displayed in a format (for example, color) based on the specified region 502.

Marks 504 corresponding to a object 105 entirely contained in the specified region 501 are displayed in a format (a color different from those of marks reflecting edge components extracted in the other specified regions) based on the specified region 501.

Furthermore, for an object 104 over the specified regions 502 and 503, marks 505 corresponding to edge components extracted in the specified region 502 are displayed in the same color as that of the marks 108, 109 for the object 103. In addition, marks 506 corresponding to edge components extracted in the specified region 503 are displayed in a color different from those of the other marks.

It is to be noted that of the marks 504, the mark corresponding to a left side 112 of the object 105 is, in terms of the display position, overlapped with the mark 505 corresponding to the object 104. The mark 504 is displayed in the same display format (here, color) as the marks 505 up to the height of the mark 505.

Also in FIG. 14B showing a vertical display corresponding to FIG. 14A, individual marks constituting a waveform image are displayed in display formats different for each specified region.

Marks 507 corresponding to sides 126 of the object 105 are the same as the marks 127 in FIG. 11B in terms of position and level. However, in order to deal with the edge components extracted in the specified region 501, the marks 507 are displayed in a format (for example, color) different from those for other marks corresponding to the edge components extracted in the specified regions 502 and 503.

Marks 508 correspond to edge components for the object 104, extracted in the specified region 502. Furthermore, marks 509 correspond to edge components for the object 104, extracted in the specified region 503. The marks 508 and 509 have the same level, but different display colors. As described above, the marks 507 to 509 are extracted respectively in the different specified regions, and thus displayed respectively in different formats (for example, display colors).

It is possible to arbitrarily set the display format for the marks (marks with an overlap) corresponding to edge components extracted over more than one region of the specified regions 501, 502, 503. For example, it is assumed that there are the specified region 503, the specified region 502, and the specified region 501 in descending order of priority. This permits the levels of edge components extracted in the specified region on the lower side of the display screen to be displayed from the bottoms of marks. However, in a case in which attention is desired to be paid to the central section of a captured image for focusing, the priority of the central specified region 502 may be increased.

A mark 510 refers to an edge component corresponding to a side 123 of the object 104, displayed as a waveform, and extracted in the specified region 503, and is thus displayed in a format (here, color) different from those for the other marks corresponding to the edge components extracted in the specified region 501 and the specified region 502.

As described above, according to the present embodiment, the marks indicating the sizes and positions of edge components are adapted to be displayed in different formats depending on the regions from which the edge components have been extracted. Therefore, in addition to the advantageous effects of the third embodiment, the photographer can figure out the degree of in-focus in a desired specified region more clearly and easily.

Fifth Embodiment

Next, a fifth embodiment of the present invention will be described. The present embodiment is characterized in that a preset level range is displayed in the generation of a waveform image to allow the ratio of an image covered with the waveform image to be reduced.

The configuration of an image capturing apparatus according to the present embodiment is as described in FIG. 6, and a video control unit 615 has the same configuration as in the third embodiment (FIG. 10). Thus, redundant description will be omitted. However, the region specifying circuit 214' is not used in the present embodiment, but is used in a sixth embodiment described later.

An image synthesizing circuit 210 in the video control unit 615 according to the present embodiment synthesizes image signals and a waveform image based on edge information read out from a bank memory unit 206 by a memory controller B 211, and displays the synthesized image on a first display unit 622 and/or a second display unit 623. In this case, a waveform image is synthesized, based on edge information in a preset level range, for example, edge information from the maximum value to a preset level range among extracted edge components, for example, for each horizontal axis as a direction of extracting edge information. This allows a portion of a shot image covered with the waveform image to be reduced.

Specifically, the memory controller B 211 reads out edge information written by a memory controller A 204 into a waveform memory Bank1 207 or a waveform memory Bank2 208, and supplies the edge information to the image synthesizing circuit 210. The image synthesizing circuit 210 generates from the edge information and a preset level range, a waveform image representing the edge information and the extracted positions, as described above, and aligns and synthesizes the waveform image with a captured image for displaying the synthesized image on the first display unit 622 and/or the second display unit 623. The level range of the edge information in the image synthesizing circuit 210 is controlled by a system control unit 611.

Figure 15A:
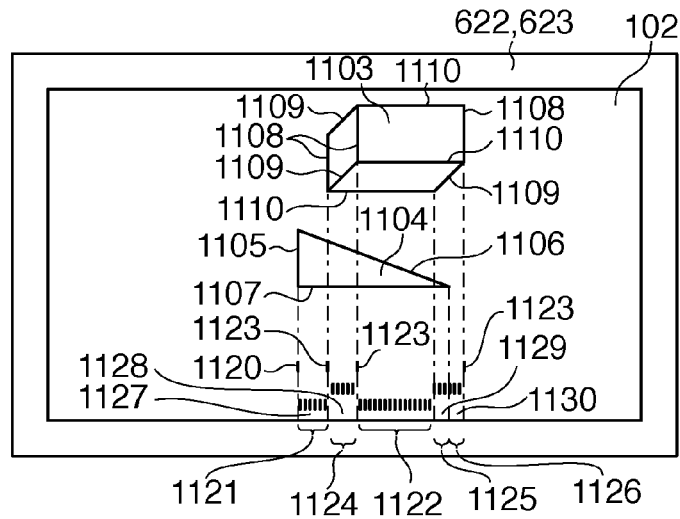
FIGS. 15A and 15B are diagrams illustrating screens on which a waveform image is displayed along with a captured image, according to fifth and sixth embodiments of the present invention.

FIG. 15A described later represents an aspect in which a shot image is displayed over the entire screen, whereas a waveform image is superimposed on the lower side of the screen. Of the waveform display, only edge information in a preset level range is displayed. Thus, as compared with the case of displaying edge information in the range of all levels as in FIG. 15C, the extent overlapped with a shot image can be reduced to allow more of the shot image to be visually recognized.

In addition, also in the present embodiment, in order to make the waveform image more visible, a background color (such as a semi-transmissive black) may be displayed on the background of the waveform image. In such a case, the visibility of the waveform image can be improved by superimposing a background color on image signals and then superimposing a waveform image on the background color.

FIG. 15A shows, as an example, a screen in which a waveform image of edge information is superimposed on a captured image displayed on the first display unit 622 and/or the second display unit 623. In the present embodiment, in a case in which a manual focusing mode is set via an input operation unit 613, for example, in an image capturing mode, a waveform image of edge information as an assist indication is superimposed on a captured image. In the shooting mode, through images are sequentially displayed on the first display unit 622 and/or the second display unit 623, which function as electronic viewfinders. As described above, on the basis of the direction and distance of a focal shift in response to the operation of adjusting the focal length via a switch, a lever or the like included in the input operation unit 613, the system control unit 611 controls a lens driving unit 608 and changes the focal length of a lens unit 601.

In the display (horizontal display) in FIG. 15A, a waveform indicating signals of edge components in the horizontal direction of a captured image is displayed on the lower side of the screen in a case in which it is assumed that the display screen is horizontally long with an aspect ratio of 16:9. In the present embodiment, the edge components displayed as a waveform are limited to a preset level range. More specifically, the waveform display in sections denoted by reference numerals 1127, 1128, 1129, 1130 in FIG. 15A is deleted by waveform display processing described later to make the shot image more visible. In other words, in a case in which the waveform display processing according to the present embodiment is not carried out, the shot image will be covered with the waveform display as in sections denoted by reference numerals 1137, 1138, 1139, 1140 in FIG. 15C (or the shot image is hard to recognize even in the case of a blend).

In the waveform display, it is not always necessary to display all levels as a waveform display of edge components, and it is possible to check the degree of in-focus as long as the peak level (maximum value) is determined. Therefore, the difference between the level display in the set range and the level display out of the range, the display of levels in the range and the non-display of levels out of the range in the present embodiment, reduce the extent of the shot image covered with the waveform display as much as possible, and allows the shot image to be checked. Furthermore, the waveform display representing the levels of extracted edge components is carried out to allow the degree of in-focus to be clearly ascertained.

On an effective display surface 102, a captured image and various pieces of shooting information, a waveform image of edge components as an assist indication for manual focusing, etc. are displayed.

In the screen shown in FIG. 15A, sides 1108 parallel to the vertical direction of the effective display surface 102 and obliquely shown sides 1109, which belong to an object 1103 in the shape of a rectangular parallelepiped, are extracted as edge components in the horizontal direction.

Strictly speaking, while it is not necessarily the case that the slope of an edge of the object changes the strength of the edge component, it is assumed here for simplicity that the sides 1108 have higher levels of edge components as compared with the sides 1109 and a side 1106 of a triangle object 1104. Therefore, marks 1123 in the corresponding waveform image are also displayed with larger magnitudes (at higher levels as marks).

In addition, it is assumed that the levels of edge components in the horizontal direction for the sides 1109 are not as high as those of the sides 1108, and marks 1124, 1125, 1126 of the corresponding waveform image are also displayed with smaller magnitudes. Furthermore, the marks 1124, 1125, 1126 are respectively related to the parallel sides 1109, thus have heights equal to the levels of extracted edge components equal to each other. However, the marks 1124 reflect the levels of edge components extracted for the two sides 1109 in the bottom plane and top plane of the object 1103, and thus with a higher frequency of extractions, exhibits a higher luminance than the marks 1125, 1126.

Sides 1105, 1106 of the triangle object 1104 with a base parallel to the long side of the effective display surface 102 are extracted as edges in the horizontal direction. Then, a mark 1120 is displayed at the horizontal position corresponding to the side 1105. Furthermore, marks 1121, 1122 are displayed in sections with no other high marks (sections except for the marks 1123, 1124, 1125) at the horizontal position corresponding to the side 1106.

Figure 9:
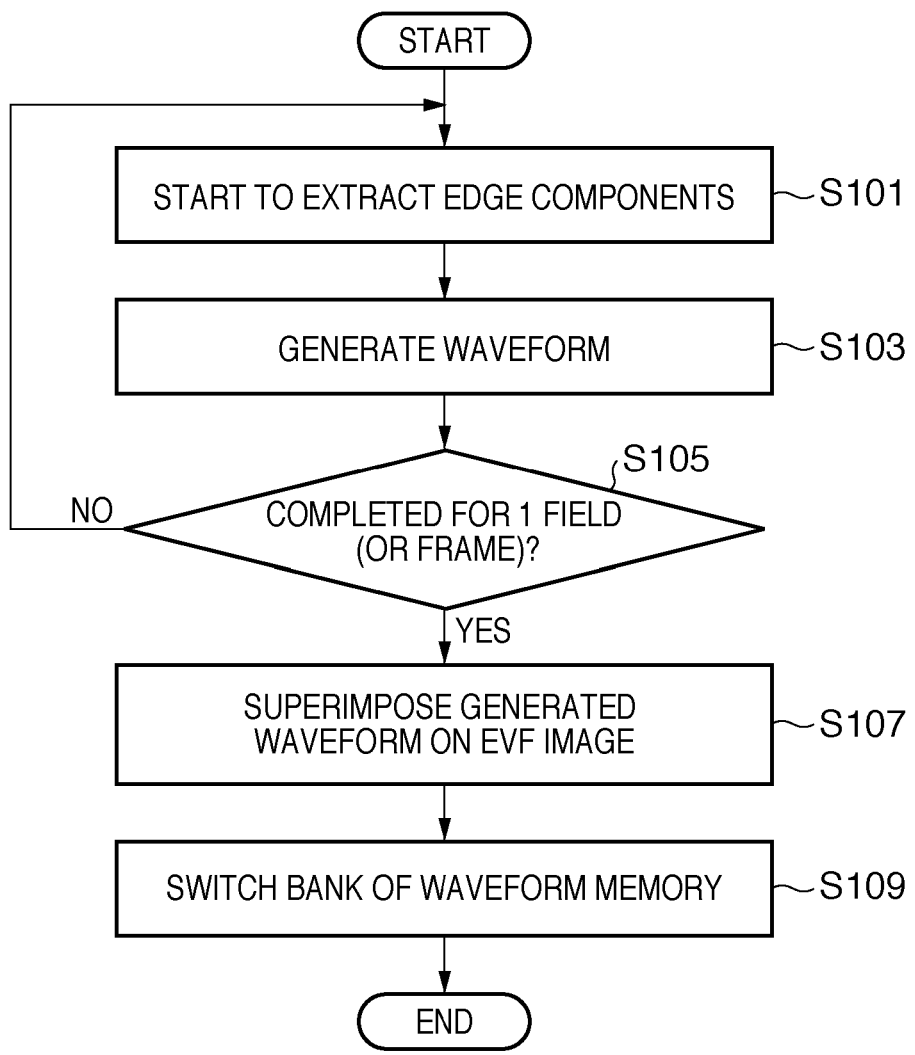
FIG. 9 is a flowchart for explaining waveform display operation during manual focusing in a high-vision digital video camera according to an embodiment of the present invention.

The waveform display processing for manual focusing in the present embodiment is essentially the same as in the first embodiment (FIG. 9).

However, in the present embodiment, when the system control unit 611 instructs the video control unit 615 to start an assistant display for manual focusing, the system control unit 611 provides information on a preset level range to the image synthesizing circuit 210.

Then, when the image synthesizing circuit 210 superimposes a waveform image on a through image in S107 to display the superimposed image on the first display unit 622 and/or the second display unit 623, the image synthesizing circuit 210 generates and displays the waveform image with data in the provided level range and data out of the level range in different display modes. In the present embodiment, the data within a certain range from the peak level is displayed, whereas the data out of the range is not displayed. Of course, as the display mode, methods such as control of the a blend value are also conceivable.

As described above, when a waveform image of edge information representing an in-focus state at the time is displayed along with a through image, the photographer can easily carry out manual focusing operation while looking through the EVF. In the present embodiment, since only the waveform in peak sections required to assist focusing are displayed in the waveform image, the degree of in-focus can be easily checked while avoiding damage to the visibility of the shot image as much as possible.

According to the present embodiment, in addition to the advantageous effects of the first embodiment, the extent of a shot image covered with a waveform image can be reduced as much as possible by displaying edge components in accordance with a preset level range, and the operation of focusing a desired object can be facilitated while visually recognizing the object.

Sixth Embodiment

Next, the sixth embodiment of the present invention will be described. It is to be noted that the sixth embodiment is, including the configuration of an image capturing apparatus, the same as the fifth embodiment, except for the waveform display processing of edge components. Thus, redundant description will be omitted, and only the difference will be described.

The present embodiment differs from the fifth embodiment in that a waveform display reflecting the levels of edge components extracted from preset specified regions of a captured image are displayed so as to be distinguishable for each region specified in advance. More specifically, the relationship between the fifth embodiment and the sixth embodiment is the same as the relationship between the first embodiment and the third embodiment.

A region specifying circuit 214' has the function of providing, in accordance with a region specifying signal, a memory controller A 204 with information on a region specified via a system control unit 611 in an image represented by captured image signals. The region which can be specified by the system control unit 611 through the region specifying circuit 214' is not particularly limited in size, number, or position. It is assumed here that two rectangular regions (specified regions 301, 302) indicated by dotted lines are set in FIG. 15B.

In the same way as in the third embodiment, in writing to a bank memory unit 206, edge components extracted in specified regions provided by region specifying signals from the region specifying circuit 214', a memory controller A 204 adds different pieces of flag information to each specified region. Then, a memory controller B 211 reads out the edge information including the flag information, and on the basis of the flag information, an image synthesizing circuit 210 generates a waveform image so that the display mode (for example, display color) of the edge information for the specified regions is different from that of the edge information in a region other than the specified regions.

For example, depending on the presence or absence of flag information and the values for the flag information, a waveform image is generated which is composed of marks with different colors from each other. It is to be noted that as long as marks reflecting only edge components extracted in the region other than specified regions are visually distinguishable from marks reflecting edge components extracted in the individual specified regions, a waveform image may be generated and/or displayed by a method other than using different colors. When flag information is contained in the data of the read edge information, the image synthesizing circuit 210 displays the data so as to be visually distinguished from the edge components containing no flag information.

Figure 15B:
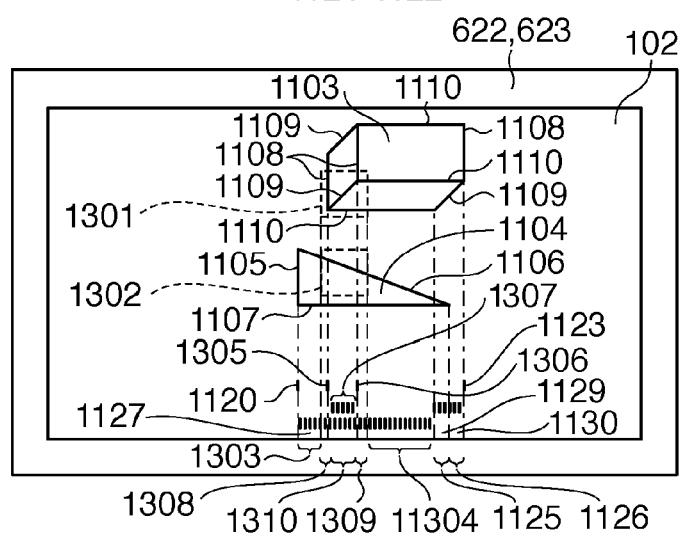
Figure 15C:
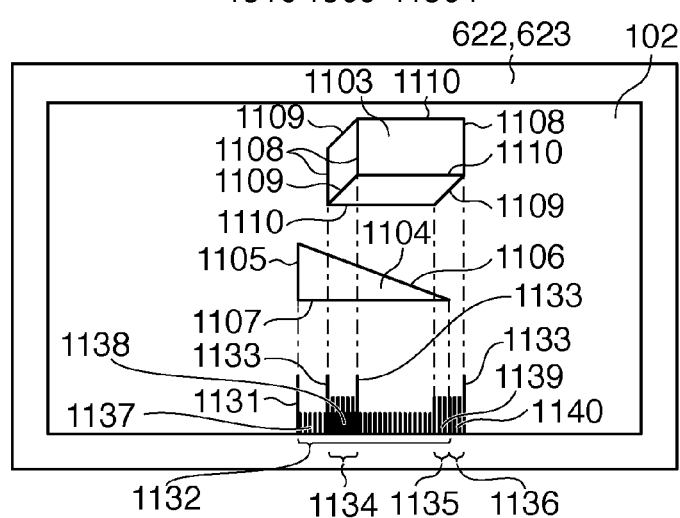
FIG. 15C is a diagram schematically illustrating a similar screen according to the first embodiment of the present invention.

FIG. 15B shows an aspect in which a display of image signals is provided over the entire screen, whereas a waveform image is superimposed on the lower side of the screen. It is to be noted that although in black and white in FIG. 15B, the waveform display of edge components extracted in the specified regions 1301, 1302 is displayed in a color different from that of the waveform display of edge components extracted in the region other than the specified regions. The display color of the edge components for the specified regions can be specified by the system control unit 611. Furthermore, while waveform displays corresponding to an edge section over the specified region and the other region are displayed at the same position in the horizontal direction, sections with different levels can be visually recognized. In addition, portions with the same level can be synthesized for display in the image synthesizing circuit 210 in order of priority in accordance with the system control unit 611.

FIG. 15B shows an example of "horizontal display", as in FIG. 15A described in the fifth embodiment. In the example of FIG. 15B, it is assumed that the specified regions 1301, 1302 are newly set. It is to be noted that the specified regions are not particularly limited in size, number, or position.

In the example of FIG. 15B, it is marks 1305, 1306 that correspond to sections of sides 1108 contained in the specified 1301, whereas it is marks 1307 that correspond to a section of a side 1109. The marks 1305, 1306, 1307 for the edge components contained in the specified region 1301 are displayed here in a different display mode, for example, in a display color, from those of the other marks. On the other hand, it is marks 1308, 1309, 1310 that correspond to a section of a side 1106 contained in the specified region 1302, and these marks are also displayed in a different display mode, for example, in a display color, from those of the other marks.

As described above, of the edge components contained in each of the specified regions 1301, 1302, the sections in the preset level range are displayed, and the sections out of the level range are not displayed, as well as the use of different display colors. Thus, not only is the set level range displayed from the maximum, like the 1123, 1124 in FIG. 15A, but also the marks 1305, 1306, 1307 and the marks 1308, 1309, 1310 in FIG. 15B are independently displayed from each other. Therefore, the in-focus state for the object in each specified region in the shot image can be easily distinguished.

It is possible to arbitrarily set the display mode in the case of, among the marks 1305, 1306, 1307 and the marks 1308, 1309, 1310, marks with an overlap for edge components with the same level, which are extracted at the same position in the horizontal direction. For example, it is assumed that there are the specified region 1301 and the specified region 1302 in descending order of priority. This permits edge components extracted in the specified region on the lower side of the display screen to be displayed from the bottoms of the marks. However, in a case in which attention is desired to be paid to the central section of a captured image for focusing, the priority of the central specified region 1302 may be increased.

Figure 13:
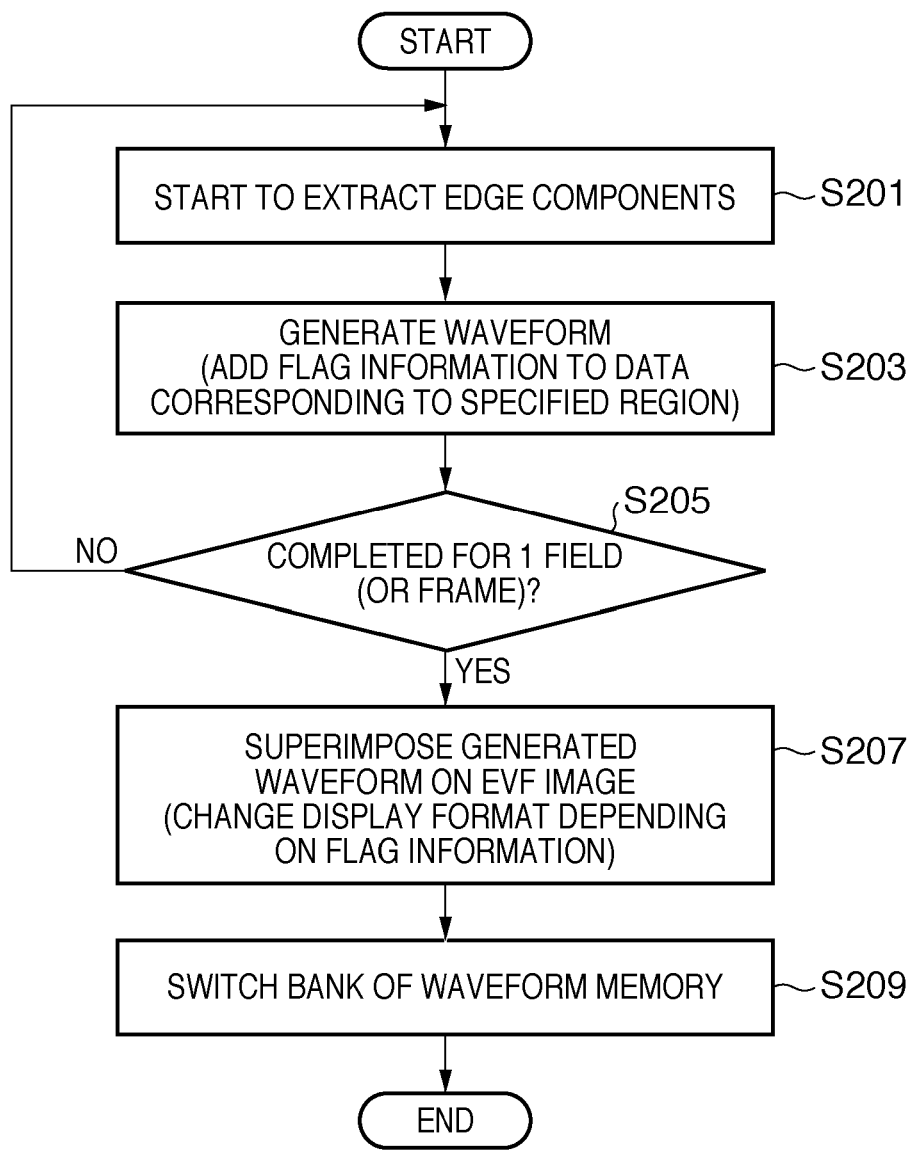
FIG. 13 is a flowchart for explaining a waveform display operation during manual focusing in a high-vision digital video camera according to the third embodiment of the present invention.

The waveform display processing for manual focusing in the present embodiment is essentially the same as in the third embodiment (FIG. 13).

However, in the present embodiment, when the system control unit 611 instructs a video control unit 615 to start an assistant display for manual focusing, the system control unit 611 provides information on a preset level range to the image synthesizing circuit 210.

Then, when the image synthesizing circuit 210 generates a waveform image and superimposes the generated waveform image on a through image in S207, the waveform image is displayed with data in the specified region and data in the other region in different modes, and further with data in the provided level range and data out of the level range in different display modes. In the present embodiment, in the display modes for the data in the level range and the data out of the level range, the data within a certain range from the peak level is displayed, whereas the data out of the range is not displayed. Of course, as the display mode, methods such as control of the α blend value are also conceivable.

In the present embodiment, in addition to the advantageous effects of the fifth embodiment, the degrees of in-focus in the specified regions can be easily checked since sections of a waveform image reflecting the levels of edge components in the specified regions are displayed so as to be visually distinguishable from the other sections.

Seventh Embodiment

Next, a seventh embodiment of the present invention will be described. It is to be noted that the seventh embodiment is the same as the sixth embodiment, except for the configuration of a video control unit 615 and the waveform display processing of edge components. Thus, redundant description will be omitted, and only the difference will be described.

Figure 16:
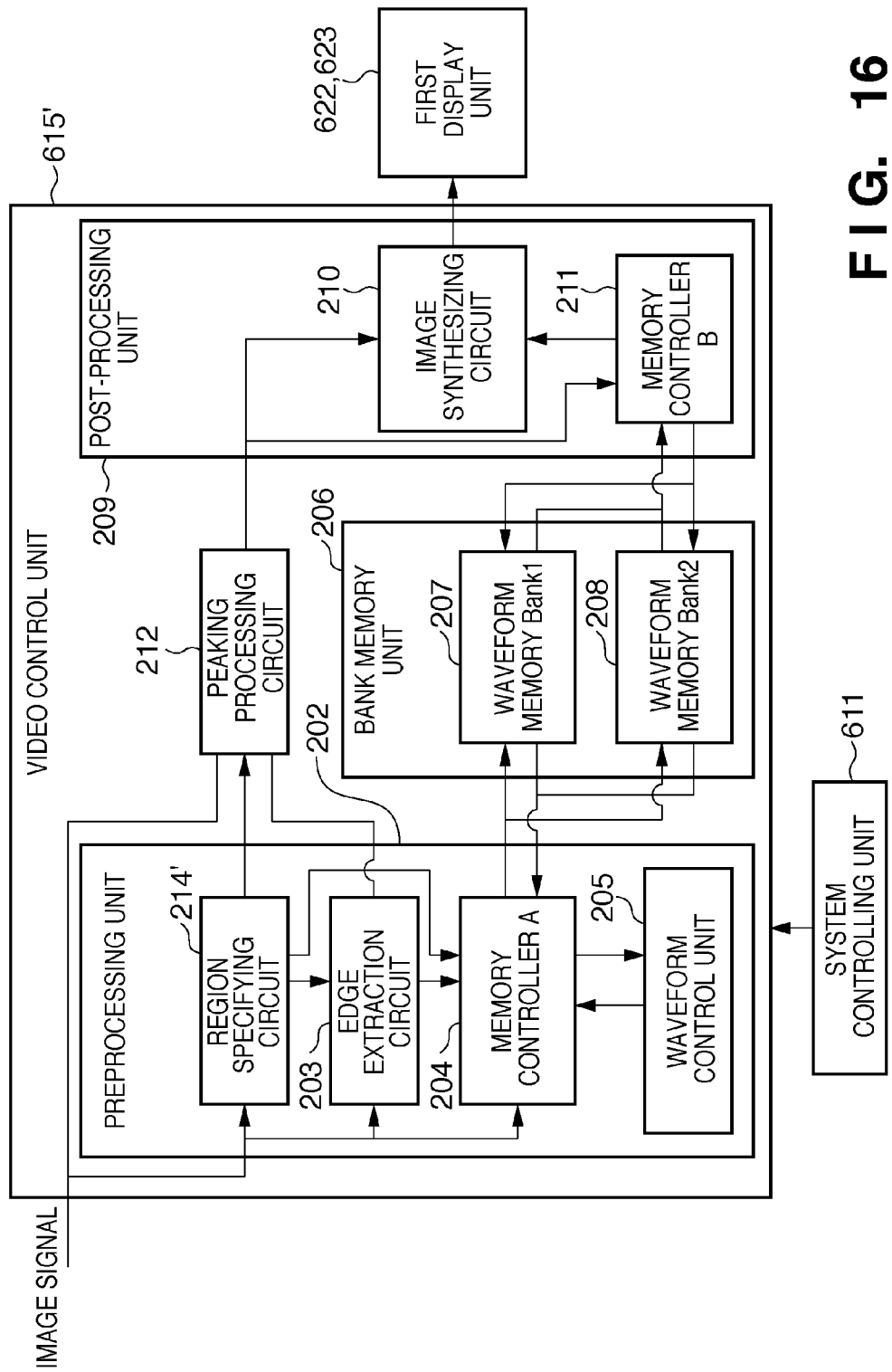
FIG. 16 is a block diagram illustrating the configuration of a video control unit according to a seventh embodiment of the present invention.

The present embodiment differs from the sixth embodiment in that a video control unit 615' has a peaking processing circuit 212, as shown in FIG. 16. The peaking processing circuit 212 carries out peaking processing for emphasizing an edge portion focused in a specified region of a captured image. An image synthesizing circuit 210 superimposes a waveform image on a captured image subjected to the peaking processing.

A region specifying circuit 214' has the function of providing, in accordance with a region specifying signal, a memory controller A 204 and the peaking processing circuit 212 with information on a region specified via a system control unit 611 in an image represented by captured image signals. The region which can be specified by the system control unit 611 through the region specifying circuit 214' is not particularly limited in size, number, or position. It is assumed here that three rectangular regions (specified regions 114, 115, 116) indicated by alternate long and short dash lines are set in FIG. 17A.

Figure 17A:
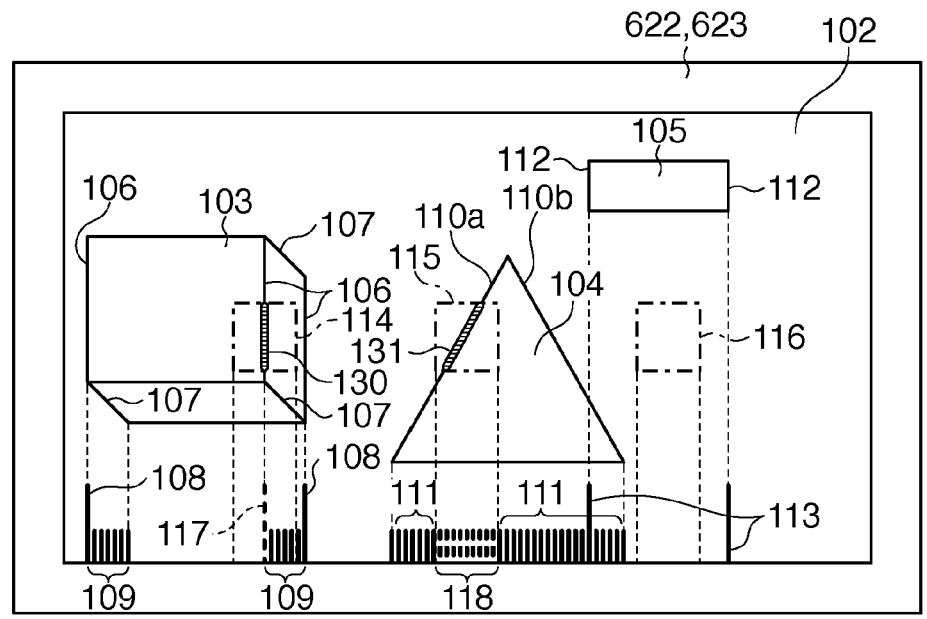
FIGS. 17A and 17B are diagrams schematically illustrating a screen of horizontal display of a waveform image along with a captured image and a screen of vertical display of the waveform image along with the captured image according to the seventh embodiment of the present invention.

FIG. 17A shows, although in black and white, an aspect in which the waveform display of edge components extracted in specified regions 114 to 116 is displayed in a color different from that of edge components extracted in the region other than the specified regions, and in which peaking processing is applied to the captured image in the specified regions. The display color of edge components for the specified regions and the edge display color for the peaking processing in the specified regions can be set in the system control unit 611. Furthermore, the system control unit 611 controls ON/OFF of peaking processing in the peaking processing circuit 212, and controls the gain of peaking processing and the display colors.

Figure 18A:
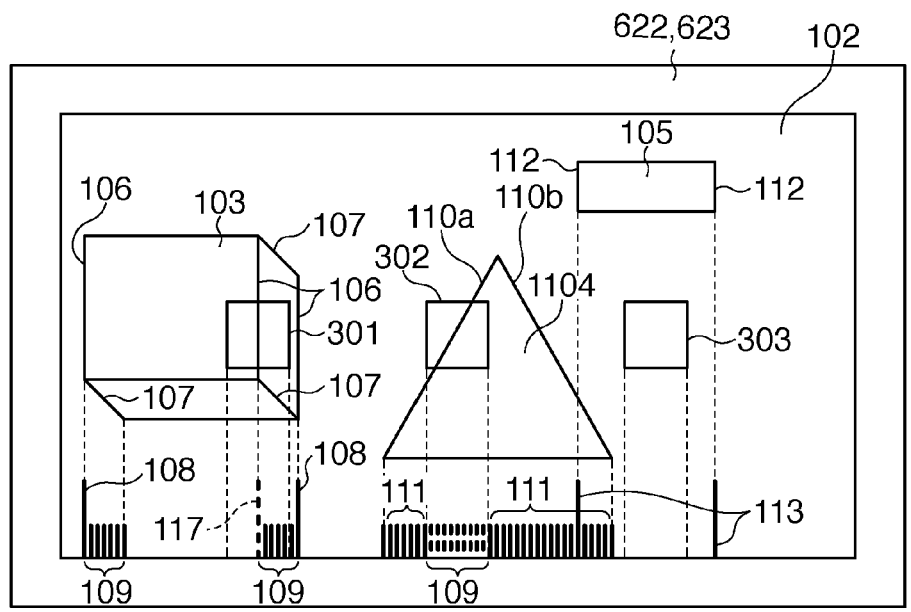
FIGS. 18A and 18B are diagrams schematically illustrating a screen of horizontal display of a waveform image along with a captured image and a screen vertical display of the waveform image along with the captured image according to an eighth embodiment of the present invention.

With peaking displays applied to the specified regions, the image in the regions is processed with peaking as the regions come closer to their in-focus states, thereby making it possible to visually check what sections in the image has edge components displayed as a waveform. Unlike displays 301, 302, 303 shown in FIG. 18A, the peaking display is not steadily superimposed on the image, and thus without interfering with checking the objects, the specified regions and their in-focus state can be checked at the same time.

As described above, in the present embodiment, a waveform display representing the levels of edge components extracted in specified regions in a captured image is displayed in a different mode (for example, a different display color) from that of edge components extracted in the region other than the specified regions, thereby allowing the degrees of in-focus in the specified regions to be clearly ascertained. The display mode for the specified regions can be likewise ascertained by applying the peaking processing to the regions.

In the horizontal display shown in FIG. 17A, sides 106 parallel to the vertical direction of an effective display surface 102 and obliquely shown sides 107, which belong to an object 103 in the shape of a rectangular parallelepiped, are extracted as edges in the horizontal direction. Strictly speaking, while it is not necessarily the case that the slope of the object changes the levels of the edge components, it is assumed here for simplicity that the sides 106 have higher levels of edge components as compared with the sides 107 and sides 110a, 110b.

Therefore, marks 108 and 117 of the corresponding waveform image are also displayed with larger magnitudes (larger lengths).

In addition, a mark 118 corresponding to a side 106 with a section contained in the specified region 114 is displayed in a different way from the marks 108. It is to be noted that while the mark 117 is expressed by a dotted line in FIG. 17A because it is not possible to express the difference in color, any visually distinguishable display modes can be employed in practice such as different display colors, flashing, or varied luminance levels.

For example, the marks 117 and 118 reflecting the levels of edge components in the specified regions 114 and 115 are displayed in "red", whereas the marks 108, 109, 111, 113 reflecting the levels of edge components extracted in the region other than the specified regions are displayed in "green". This allows the degree of in-focus for a region of interest to be easily checked while checking the degree of in-focus for the entire captured image.

It is to be noted that while the mark 118 is a mark reflecting both the edge component extracted from the specified region 115 and the edge component extracted from the region other than the specified region, it is assumed here that the setting is made for preferentially displaying the edge component in the specified region 115.

In addition, it is assumed that the levels of edge components in the horizontal direction for the sides 107 are not as high as those of the sides 106, and the marks 109 of the corresponding waveform image are also displayed with smaller magnitudes. Furthermore, the right and left marks 109 are related to the parallel sides 107, thus have equal heights with the levels of extracted edge components equal to each other. However, the right marks reflect edge components extracted for the two sides 107 in the bottom plane and top plane of the object 103, and thus with a higher frequency of extractions, exhibits a higher luminance than the left marks.

Furthermore, the sides 110*a*, 110*b* of a triangle object 104 with a base parallel to the effective display surface 102 are extracted as edges in the horizontal direction. Then, the marks 111 and 118 are displayed at a horizontal position corresponding to the sides 110*a*, 110*b*.

While the marks 111 and 118 all refer to marks corresponding to the sides 110*a*, 110*b*, the marks 118 correspond to a section of the side 110*a* contained in the specified region 115, and is thus different from the marks 111 in display mode.

An object 105 has a rectangular shape with long sides parallel to the long side of the effective display surface 102 and short sides 112 parallel to the short side of the effective display surface 102. Marks 113 for edge components corresponding to the short sides 112 are displayed. It is to be noted that a section of the mark 113 corresponding to the left side of the short sides 112, which is overlapped with the marks 111 corresponding to the side 110*b* of the object 104 is displayed with a higher luminance.

While the specified regions 114 to 116 may or may not be displayed, the image in the specified regions is subjected to peaking processing, and for example, marks 130, 131 shown in FIG. 17A are synthesized and displayed on the image, and presented as marks for manual focusing operation. The display/peaking of the specified regions is carried out by giving instructions such as a display position or a display color from the system control unit 611 to the region specifying circuit 214' and the peaking processing circuit 212.

Figure 17B:
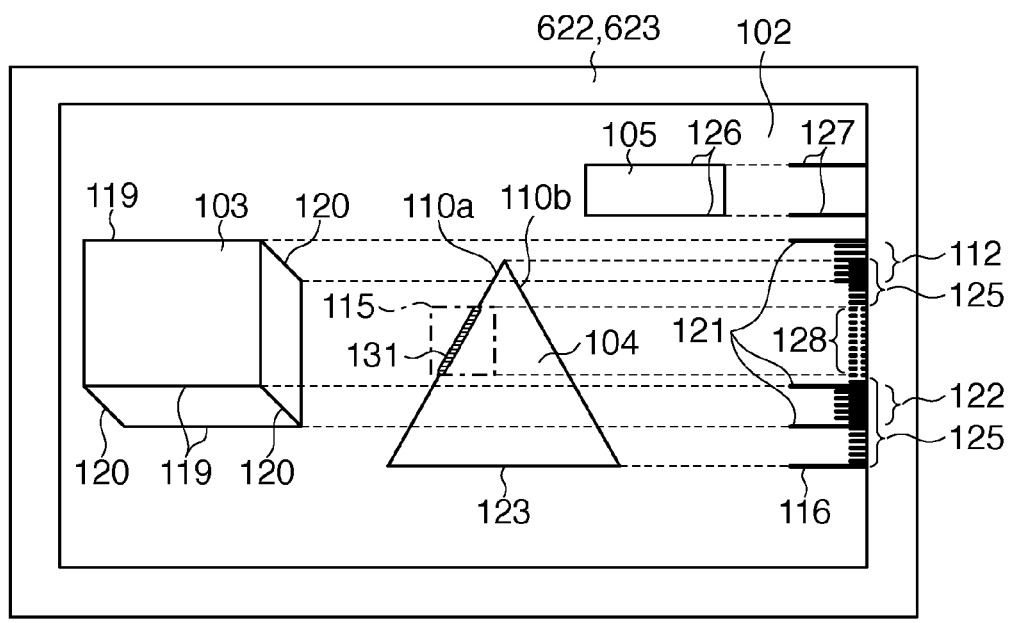

FIG. 17B shows vertical display carried out in a case in which there is one specified region 115, with a captured image of the same objects as in FIG. 17A. As in the case of horizontal display, it is assumed for simplicity that edge components for horizontal sides 119, 123, and 126 of the objects 103 to 105 have high levels. Therefore, corresponding marks 121, 116, and 127 are displayed with large magnitudes (large lengths). In addition, marks 122, 125, and 128 are displayed for oblique sides 120, 110*a* and 110*b*.

While the marks 125 and 128 all refer to marks reflecting the combined edge components for the sides 110*a* and 110*b*, the marks 128 which correspond to a section of the side 110*a* contained in the specified region 116, is displayed in a different way from the marks 125.

Again as in the case of the horizontal display, for example, the marks 128 reflecting the level of an edge component extracted in the specified region 116 are displayed in "red", whereas the marks 121, 122, 116, 125, 127 reflecting the levels of edge components extracted in the region other than the specified region are displayed in "green". This allows the degree of in-focus for a region of interest to be easily checked while checking the degree of in-focus for the entire captured image.

Also in FIG. 17B, as for the right and left marks 122 for oblique sides 120 in the waveform image for the subject 103, the lower marks are displayed with a higher luminance (because of the larger number of the reflected sides 120). In addition, sections of the marks 122 overlapped with the marks 125 are displayed with a higher luminance than the sections with no overlap with the marks 125.

It is to be noted that while it is assumed that there is one specified region in the example of FIG. 17B for simplicity, it goes without saying that there may be multiple regions.

The horizontal display and the vertical display can be configured, for example, in such a way that switching between the horizontal display and the vertical display is carried out for display each time a switching key included in an input operation unit 613 is pressed. Alternatively, both the horizontal display and the vertical display may be carried out. Furthermore, it is not necessary to superimpose the waveform image on the captured image, and the waveform image may be displayed around the capture image unless the captured image is a full-screen display. Also in this case, it goes without saying that the position of the waveform image is related to the position of the captured image.

It is to be noted that the waveform display of edge components for the entire captured image is carried out in the examples of FIGS. 17A and 17B, in such a way that the marks reflecting the levels of edge components extracted in the specified region(s) in the waveform display can be visually distinguished from the other marks. However, even when the waveform display based on only edge components extracted in a specified region is carried out, the degree of in-focus in the specified region can be easily distinguished. In this way the photographer can optionally and dynamically switch which display is carried out, and the function may be assigned to the input operation unit 613 or the like.

The waveform display processing for manual focusing operation in the present embodiment will be described. In the flowchart shown in FIG. 9, the same steps of processing as in FIG. 17B are denoted by the same step numbers, and description of the step will be omitted below. In addition, it is assumed that any level range is preset.

The waveform display processing is the same as in the sixth embodiment from the step in which the system control unit 611 provides the image synthesizing circuit 210 with information on the preset level range to the step (S201) in which in response to this start instruction, an edge extraction circuit 203 starts to extract edge information. After that, on the basis of the extracted edge information and the preset region information, the system control unit 611 instructs the peaking processing circuit 212 to apply peaking processing to a specified region. Subsequently, the processing from S203 in the sixth embodiment is carried out.

According to the present embodiment, in addition to the configuration in sixth embodiment, peaking processing is applied to an image corresponding to a specified region in a position indication of the specified region itself. Thus, without covering a shot image, focusing operation can be carried out while easily figuring out what section in the image refers to a specified region.

Eighth Embodiment

Next, an eight embodiment of the present invention will be described. It is to be noted that the eighth embodiment is, including the configuration of an image capturing apparatus, the same as the seventh embodiment, except for the waveform display processing of edge components. Thus, redundant description will be omitted, and only the difference will be described.

While the peaking processing is applied to the image in the specified regions to indicate the positions of the specified regions on the image in the seventh embodiment, in addition to this peaking processing, the display mode for the original image is different between specified regions and in the region other than the specified regions in an image in the eight embodiment.

Figure 18B:
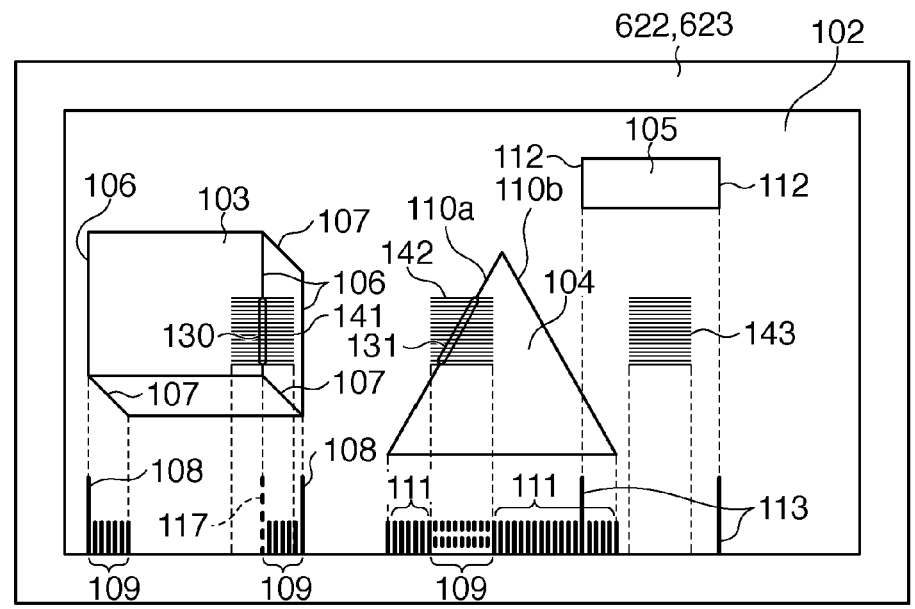

Specifically, as shown in FIG. 18B, the image in rectangular regions 141, 142, 143 (corresponding to the rectangular regions 114, 115, 116 in FIG. 17A) is displayed in black and white. While the rectangular regions 141, 142, 143 are indicated by horizontal lines in FIG. 18B for the sake of convenience, the regions are displayed in black and white in practice, whereas the other region presents a color display (normal display). This allows specified regions to be clearly indicated in a case in which edge components are not sufficiently recognized due to peaking display in a defocused state, or in a case in which objects originally with a small number of edge components are to be shot. Furthermore, in the peaking processing, the combined use of an indication with edge portions colored allows the peaking display to be also made clear while representing specified regions, and allows the waveform display of edge components to be visually recognized at the same time.

According to the present embodiment, the indications showing specified regions in an image is displayed in a mode which is not dependent on the degree of in-focus. Thus, in addition to the advantageous effects of the seventh embodiment, the photographer can easily figure out the positions in the image, of the specified regions which correspond to the waveform display of edge components.

OTHER EMBODIMENTS

While only the image capturing apparatuses provided with the lens (lens unit 601) for forming an object image on the image sensor have been described in the embodiments described above, the lens is not essential in the present embodiment, and the present invention can be applied to, for example, digital cameras with interchangeable lenses.

Furthermore, in the embodiments described above, the waveform display of edge components is, for synthesis, related (matches) to the shot image in terms of position. However, as long as the positional relationship between the two can be ascertained, it is not always necessary to completely match the positions. For example, even when the waveform display of edge components in the horizontal direction is reduced to a range less than the horizontal width of the shot image, the correspondence relationship between the shot image and the waveform display can be ascertained. Thus, the same advantageous effects can be expected.

Moreover, in the present embodiments, the case has been described in which the waveform display of edge components is displayed as an assistant indication for manual focusing. However, the waveform display of edge components may be also carried out for automatic focusing in response to the user's instruction or on a steady basis. This makes it even easier to check the in-focus state and in-focus position for automatic focusing.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-94368, filed Apr. 8, 2009, No. 2009-136709, filed Jun. 5, 2009, and No. 2009-293202, filed Dec. 24, 2009, respectively and which are hereby incorporated by reference herein in their entirety.

What is claimed is:

1. An image capturing apparatus that has a function of focus adjustment of a lens for forming an object image on an image sensor, the image capturing apparatus comprising:
    an extraction unit adapted to extract an edge component of an image captured by the image sensor in a predetermined direction;
    a generation unit adapted to generate a waveform image representing a relationship between a position and a level of an edge component extracted by the extraction unit in the predetermined direction; and
    a display unit adapted to exercise control so as to sequentially display the image captured by the image sensor and the waveform image on a display device,
    wherein the waveform image has a form in which marks having a length determined by the level of the edge component are lined up in the predetermined direction.

2. The image capturing apparatus according to claim 1, wherein the display unit synthesizes the image captured by the image sensor and the waveform image so that their positions in the predetermined direction correspond to each other, and exercises control so that the image and the waveform image are sequentially displayed on a display device.

3. The image capturing apparatus according to claim 1, wherein the extraction unit extracts an edge component for each line in the predetermined direction of the image, and
    in a case in which the extraction unit extracts edge components of the same level at the same coordinates in the predetermined direction more than once, the generation unit increases a luminance of the corresponding mark as the frequency of extractions increases.

4. The image capturing apparatus according to claim 1, wherein the extraction unit extracts an edge component for a specified partial region of the image.

5. The image capturing apparatus according to claim 4, further comprising an operation unit for a photographer to specify the partial region.

6. The image capturing apparatus according to claim 1, wherein the generation unit generates the waveform image so that a portion of the waveform image reflecting an edge component extracted from a preset region of the image can be visually distinguished from a portion of the waveform image reflecting an edge component extracted from a region other than the preset region.

7. The image capturing apparatus according to claim 6, wherein in a case in which there are multiple preset regions, the generation unit generates the waveform image so that a portion of the waveform image reflecting edge components extracted from each of the multiple preset regions can be visually distinguished.

8. The image capturing apparatus according to claim 6, wherein the display unit synthesizes the image captured by the image sensor and the waveform image so that their positions in the predetermined direction correspond to each other, and exercises control so that the image and the waveform image are sequentially displayed on a display device.

9. An image capturing apparatus that has a function of focus adjustment of a lens for forming an object image on an image sensor, the image capturing apparatus comprising:
   an extraction unit adapted to extract an edge component of an image captured by the image sensor in a predetermined direction;
   a generation unit adapted to generate a waveform image representing a relationship between a position and a level of an edge component extracted by the extraction unit in the predetermined direction; and
   a display unit adapted to exercise control so as to sequentially display the image captured by the image sensor and the waveform image on a display device,
   wherein the generation unit generates the waveform image so that a portion of the waveform image reflecting an edge component extracted from a preset region of the image can be visually distinguished from a portion of the waveform image reflecting an edge component extracted from a region other than the preset region, and
   wherein the waveform image has a form in which marks having lengths determined by the levels of the edge components are lined up in the predetermined direction.

10. The image capturing apparatus according to claim 9, wherein the extraction unit extracts an edge component for each line in the predetermined direction of the image, and
   in a case in which the extraction unit extracts an edge component with the same level at the same coordinates in the predetermined direction more than once, the generation unit increases a luminance of the corresponding mark as the frequency of extractions increases.

11. The image capturing apparatus according to claim 6, further comprising an operation unit for a photographer to specify the preset region.

12. An image capturing apparatus that has a function of focus adjustment of a lens for forming an object image on an image sensor, the image capturing apparatus comprising:
   an extraction unit adapted to extract an edge component of an image captured by the image sensor in a predetermined direction;
   a generation unit adapted to generate a waveform image representing a relationship between a position and a level of an edge component extracted by the extraction unit in the predetermined direction; and
   a display unit adapted to exercise control so as to sequentially display the image captured by the image sensor and the waveform image on a display device,
   wherein the generation unit generates the waveform image in which, of edge information extracted by the extraction unit, edge information in a preset level range and edge information out of the range are displayed in different display modes that can be visually distinguished.

13. The image capturing apparatus according to claim 12, wherein the display unit synthesizes an image captured by the image sensor and a waveform image generated by the generation unit.

14. The image capturing apparatus according to claim 12, wherein the generation unit generates the waveform image in which edge information extracted from a previously specified region in an image captured by the image sensor and edge information extracted from a region other than the specified region are displayed in different display modes that can be visually distinguished.

15. The image capturing apparatus according to claim 14, wherein in a case in which there are multiple previously specified regions, the generation unit generates the waveform image so that edge information extracted from each of the previously specified regions is displayed in a display mode that is different from the display mode for edge information extracted from any other previously specified region.

16. The image capturing apparatus according to claim 12, wherein the display unit superimposes an image captured by the image sensor and the waveform image so that their positions in the predetermined direction are the same.

17. The image capturing apparatus according to claim 16, wherein the waveform image is composed of multiple marks with lengths determined by a magnitude of the edge component, with the marks arranged in the predetermined direction.

18. The image capturing apparatus according to claim 17, wherein the extraction unit extracts edge information for each line in the predetermined direction of an image captured by the image sensor, and
   in a case in which an edge component with the same magnitude at the same coordinates in the predetermined direction is extracted more than once, the generation unit increases a luminance of the corresponding mark as the frequency of extractions with increases.

19. The image capturing apparatus according to claim 12, wherein in a case in which an image captured by the image sensor contains multiple objects, the display unit displays a waveform image for each object at positions corresponding to each object.

20. The image capturing apparatus according to claim 14, wherein the display unit displays a portion of an object corresponding to the previously specified region in a display mode different from the display mode for any other portion.

21. The image capturing apparatus according to claim 14, further comprising an operation unit adapted to a photographer to specify the previously specified region.

22. A control method for an image capturing apparatus that has a function of focus adjustment of a lens for forming an object image on an image sensor, the control method comprising:
   an extraction step of extracting an edge component of an image captured by the image sensor in a predetermined direction;
   a generation step of generating a waveform image representing a relationship between a position and a level of the edge component extracted in the extraction step in the predetermined direction; and a display step of exercising control so as to sequentially display the image captured by the image sensor and the waveform image on a display device, wherein the waveform image has a form in which a marks having a length determined by the level of the edge component are lined up in the predetermined direction.

23. A control method for an image capturing apparatus that has a function of focus adjustment of a lens for forming an object image on an image sensor, the control method comprising:

an extraction step of extracting an edge component of an image captured by the image sensor in a predetermined direction;

a generation step of generating a waveform image representing a relationship between a position and a level of the edge component extracted in the extraction step in the predetermined direction; and a display step of exercising control so as to sequentially display the image captured by the image sensor and the waveform image on a display device, wherein in the generation step, the waveform image is generated so that a portion of the waveform image reflecting an edge component extracted from a preset region of the image can be visually distinguished from a portion of the waveform image reflecting an edge component extracted from a region other than the preset region, and wherein the waveform image has a form in which marks having lengths determined by the levels of the edge components are lined up in the predetermined direction.

24. A control method for an image capturing apparatus that has a function of focus adjustment of a lens for forming an object image on an image sensor, the control method comprising:

an extraction step of extracting an edge component of an image captured by the image sensor in a predetermined direction;

a generation step of generating a waveform image representing a relationship between a position and a level of the edge component extracted in the extraction step in the predetermined direction; and a display step of exercising control so as to sequentially display the image captured by the image sensor and the waveform image on a display device, wherein in the generation step, the waveform image is generated in which, of edge information extracted in the extraction step, edge information in a preset level range and edge information out of the range are displayed in different display modes that can be visually distinguished.

25. An image capturing apparatus that has a function of focus adjustment of a lens for forming an object image on an image sensor, the image capturing apparatus comprising:

an extraction unit adapted to extract an edge component of an image captured by the image sensor in a predetermined direction;

a generation unit adapted to generate a waveform image representing a relationship between a position and a level of an edge component extracted by the extraction unit in the predetermined direction; and a display unit adapted to exercise control so as to sequentially display the image captured by the image sensor and the waveform image on a display device, wherein the waveform image represents frequencies of the levels of the edge component at each position in the predetermined direction.

26. A control method for an image capturing apparatus that has a function of focus adjustment of a lens for forming an object image on an image sensor, the control method comprising:

an extraction step of extracting an edge component of an image captured by the image sensor in a predetermined direction;

a generation step of generating a waveform image representing a relationship between a position and a level of the edge component extracted in the extraction step in the predetermined direction; and a display step of exercising control so as to sequentially display the image captured by the image sensor and the waveform image on a display device, wherein the waveform image represents frequencies of the levels of the edge component at each position in the predetermined direction.

* * * * *